United States Patent [19]

Kageyama

[11] Patent Number: 5,069,302
[45] Date of Patent: Dec. 3, 1991

[54] VEHICLE HAVING SLIP SUPPRESSING DEVICE AND SUSPENSION CONTROL DEVICE

[75] Inventor: Fumio Kageyama, Hiroshima, Japan

[73] Assignee: Mazda Motor Corporation, Hiroshima, Japan

[21] Appl. No.: 663,189

[22] Filed: Feb. 28, 1991

Related U.S. Application Data

[63] Continuation of Ser. No. 357,420, May 25, 1989, abandoned.

[30] Foreign Application Priority Data

May 26, 1988 [JP] Japan .................................. 63-128741

[51] Int. Cl.$^5$ ............................................. B60K 28/16
[52] U.S. Cl. ..................................... 180/197; 280/703; 280/707
[58] Field of Search .................... 180/197, 282, 41; 280/703, 707, 711, 714, 688

[56] References Cited

U.S. PATENT DOCUMENTS

| | | | |
|---|---|---|---|
| 3,945,664 | 3/1976 | Hiruma | 280/703 |
| 4,518,169 | 5/1985 | Kuroki et al. | 180/41 X |
| 4,671,533 | 6/1987 | Asami et al. | 280/707 |
| 4,686,626 | 8/1987 | Kuroki et al. | 280/703 X |
| 4,741,554 | 5/1988 | Okamoto | 280/703 |
| 4,805,102 | 2/1989 | Ise et al. | 280/707 X |
| 4,831,532 | 5/1989 | Kondo | 280/707 |

FOREIGN PATENT DOCUMENTS

3708581A1 10/1987 Fed. Rep. of Germany .
62-178462 8/1987 Japan .

OTHER PUBLICATIONS

Automobiltechnische Zeitschift 90, 1988, pp. 57–61.

Primary Examiner—Kenneth R. Rice
Assistant Examiner—Mitchell Bompey
Attorney, Agent, or Firm—Price, Heneveld, Cooper, DeWitt & Litton

[57] ABSTRACT

A vehicle includes: a power unit, at least a pair of driving wheels rotated by an output from the power unit, fluid pressure cylinders, inserted between a vehicle body and the driving wheels, for adjusting a vehicle height of the vehicle body at a side where the driving wheels are arranged, a fluid pressure source for supplying a high-pressure working fluid to the fluid pressure cylinders, a flow control mechanism for controlling supply and discharge of the high-pressure working fluid to and from the fluid pressure source, a slip detection device for detecting a driving force slip of the driving wheels, a brake device for decreasing a rotating force of the driving wheels, a slip suppressing device for, when the slip detection device detects a slip of the driving wheels, operating the brake device to suppress the slip, and a suspension control device for controlling the flow control mechanism to increase the vehicle height of the vehicle body of the side where the driving wheels are arranged while the slip suppressing device performs a slip suppressing operation.

17 Claims, 10 Drawing Sheets

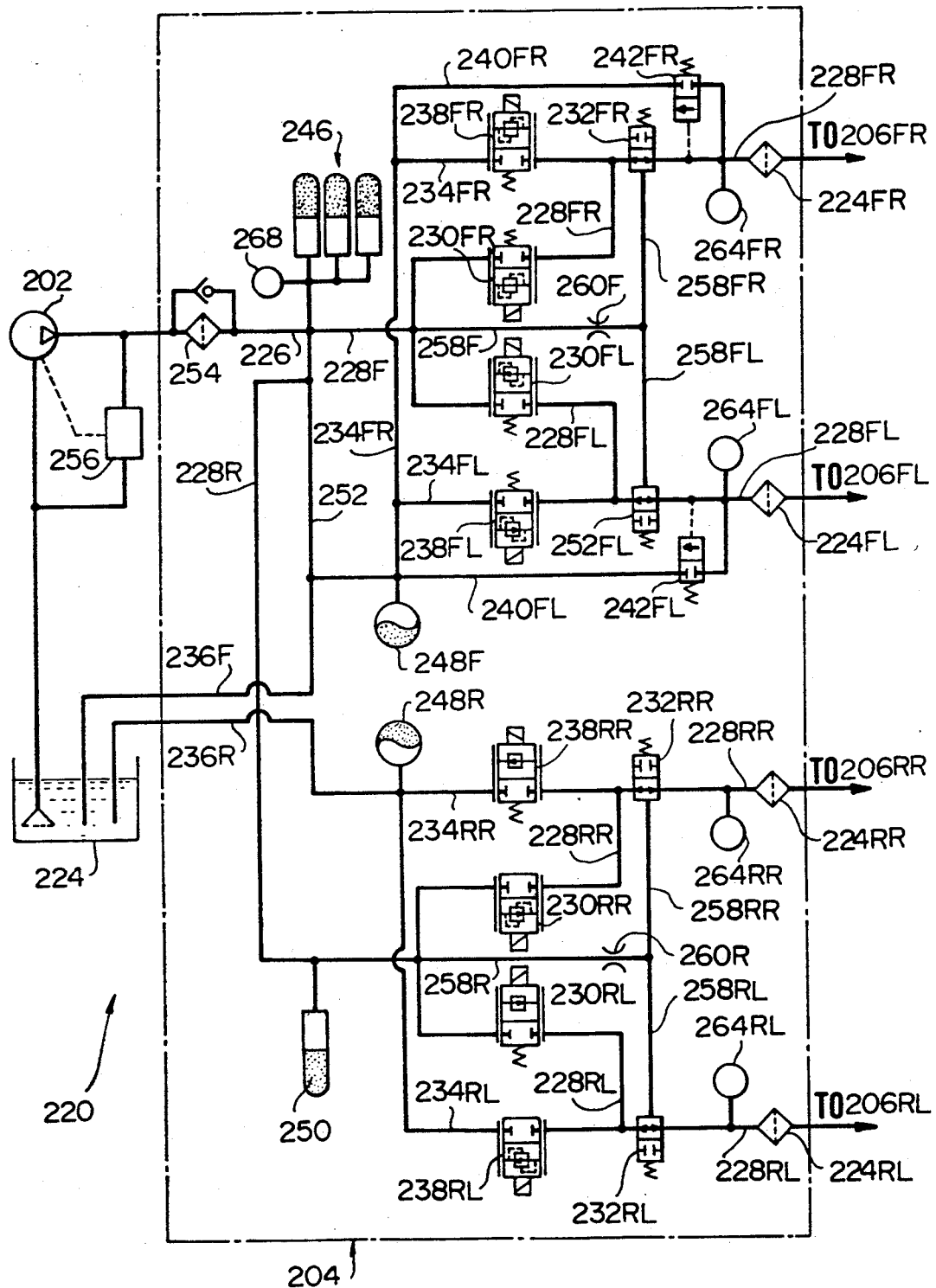
F I G. 7B

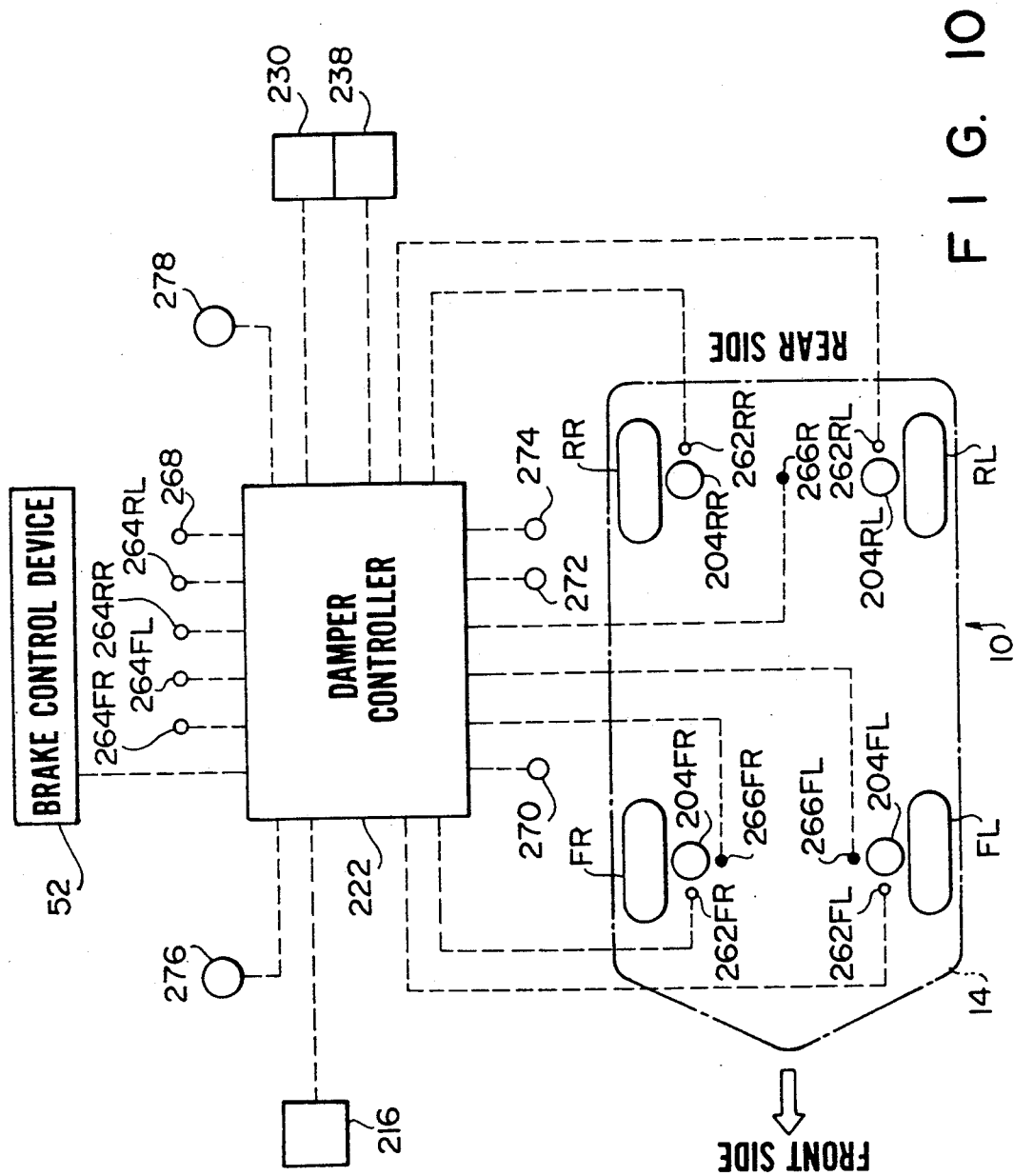

VEHICLE HAVING SLIP SUPPRESSING DEVICE AND SUSPENSION CONTROL DEVICE

This is a continuation of co-pending application Ser. No. 07/357,420 filed on May 25, 1989 now abandoned.

BACKGROUND OF THE INVENTION

The present invention relates to a slip suppressing device for detecting a slip state of driving wheels and suppressing a slip and a suspension control device for controlling a suspension state of the vehicle.

In an automobile (vehicle) which travels by rotating wheels by a driving force of an engine, when the driving force of the engine exceeds a frictional force between driving wheels and a road surface when the vehicle is immediately started or accelerated or travels on a snow road, the driving wheels slip. For example, in a rear-wheel driving vehicle, when an excessive slip occurs between rear wheels as the driving wheels and a road surface, the rear wheels make a behavior such as a skid, interfering with stable traveling, thus impairing travel stability of a vehicle.

In recent years, a technique for executing slip control (traction control) has been developed. In this technique, when driving wheels excessively slip, the rotating torque of the driving wheels is decreased to suppress the slip, thus realizing an efficient drive operation and travel stability. According to this traction control technique, a slip state of the driving wheels is detected on the basis of a difference in rotating speed between driven and driving wheels. When a slip ratio of the driving wheels exceeds a predetermined slip ratio, a brake or an accelerator is controlled to decrease the rotating torque of the driving wheels. In this manner, according to this traction control technique, the slip of the driving wheels can be effectively suppressed.

In a so-called front-engine, rear-drive vehicle in which a driving force of an engine is transmitted to rotate rear wheels through a propeller shaft arranged along a longitudinal direction of a vehicle and a differential device connected thereto, when the slip control is performed as described above and, in particular, when a slip suppressing control operation is performed by means of a brake, the rotating torque of driving wheels, i.e., rear wheels is forcibly suppressed by the braking operation of the brake. For this reason, a counterforce is generated in a direction opposite to the rotating direction of the rear wheels, and acts on the differential device.

The front and rear end portions of the differential device are supported at predetermined positions of a vehicle through a plurality of mount members. As a result, when a counterforce in a direction opposite to the rotating direction of the rear wheels acts on the differential device, an upward load acts on the front end portion of the differential device, and a downward load acts on the rear end portion. For this reason, a so-called "squat" phenomenon occurs wherein a vehicle body at the rear wheel side, i.e., a rear portion of the vehicle body becomes lower than a front portion of the vehicle body. The squat phenomenon considerably impairs comfort, thus making passengers uneasy.

For example, Japanese Utility Model Laid-Open (Kokai) No. 60-43413 discloses a technique for arranging a pair of left and right shock absorbers with air springs and a high-pressure air source connected to air chambers of the air springs of the pair of shock absorbers through communication paths. According to this prior art, a vehicle height adjusting device for adjusting a vehicle height by supplying/exhausting compressed air to/from the air chambers through the communication paths is proposed. However, the vehicle height adjusting device does not aim at preventing a so-called "squat" phenomenon of the rear portion of the vehicle body during slip control by a slip control means, which is recognized as a problem in the present invention.

SUMMARY OF THE INVENTION

The present invention has been made in consideration of the above situation, and has as its principal object to provide a vehicle having a slip suppressing device and a suspension control device which can reliably prevent a so-called squat phenomenon of a rear portion of a vehicle body during slip suppressing control, so that passengers do not feel uneasy.

It is another object of the present invention to provide a vehicle comprising a passive type suspension device, which can reliably prevent a so-called squat phenomenon of a rear portion of a vehicle body during slip suppressing control, so that passengers do not feel uneasy.

It is still another object of the present invention to provide a vehicle comprising an active type suspension device, which can reliably prevent a so-called squat phenomenon of a rear portion of a vehicle body during slip suppressing control, so that passengers do not feel uneasy.

It is still another object of the present invention to provide a vehicle in which while driving wheels causing a slip are braked to suppress the slip, a vehicle height of a vehicle body portion provided with the driving wheels is increased, thereby reliably preventing so-called squat, so that passengers do not feel uneasy.

In order to solve the above-mentioned problems and to attain the above objects, a vehicle having a slip suppressing device and a suspension control device according to a first aspect of the present invention is characterized by comprising the following arrangement.

That is, a vehicle of the first aspect comprises: a power unit; at least a pair of driving wheels rotated by an output from the power unit; fluid pressure cylinders, inserted between a vehicle body and the driving wheels, for adjusting a vehicle height of the vehicle body at a side where the driving wheels are arranged; a fluid pressure source for supplying a high-pressure working fluid to the fluid pressure cylinders; flow control means for controlling supply and discharge of the high-pressure working fluid to and from the fluid pressure source; slip detection means for detecting a driving force slip of the driving wheels; brake means for decreasing a rotating force of the driving wheels; slip suppressing means for, when the slip detection means detects a slip of the driving wheels, operating the brake means to suppress the slip; and suspension control means for controlling the flow control means to increase the vehicle height of the vehicle body of the side where the driving wheels are arranged while the slip suppressing means performs a slip suppressing operation.

A vehicle having a slip suppressing device and a suspension control device according to a second aspect of the present invention is characterized by comprising the following arrangement.

That is, a vehicle of the second aspect comprises: a vehicle body; a power unit mounted in the vehicle body; at least a pair of driving wheels rotated by an output from the power unit; suspension devices for suspending between the driving wheels and the vehicle body to be capable of adjusting a vehicle height; suspension control means for controlling a suspension state of the suspension devices; slip detection means for detecting a slip state of the driving wheels; and slip suppressing means for, when the slip detection means detects a slip of the driving wheels, decreasing a rotating force of the driving wheels to suppress a slip, and outputting a control signal to the suspension control means to increase a vehicle height of the vehicle body at a side where the driving wheels are arranged A vehicle having a slip suppressing device and a suspension control device according to a third aspect of the present invention is characterized by comprising the following arrangement.

That is, a vehicle of the third aspect comprises: a power unit; at least a pair of driving wheels rotated by an output from the power unit; vehicle height detection means for detecting a vehicle height of a vehicle body at a side where the driving wheels are arranged; fluid pressure cylinders, inserted between the vehicle body and the driving wheels, for adjusting a vehicle height of the vehicle body at the side where the driving wheels are arranged; a fluid pressure source for supplying a high-pressure working fluid to the fluid pressure cylinders; flow control means for controlling supply and discharge of the high-pressure working fluid to and from the fluid pressure source to obtain a predetermined vehicle height on the basis of the detection result from the vehicle height detection means; slip detection means for detecting a driving force slip of the driving wheels; brake means for decreasing a rotating force of the driving wheels; slip suppressing means for, when the slip detection means detects a slip of the driving wheels, operating the brake means to suppress the slip; and suspension control means for controlling the flow control means to increase the vehicle height of the vehicle at the side where the driving wheels are arranged through the output from the vehicle height detection means while the slip suppressing operation is performed by the slip suppressing means.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 7B is a circuit diagram showing an arrangement of the suspension control device for controlling the suspension devices shown in FIG. 7A;

FIG. 10 is a schematic block diagram showing an arrangement of the suspension control device for controlling a suspension state of the suspension device shown in FIG. 8.

DETAILED DESCRIPTION OF THE PREFERRED EMBODIMENTS

Figure 1:
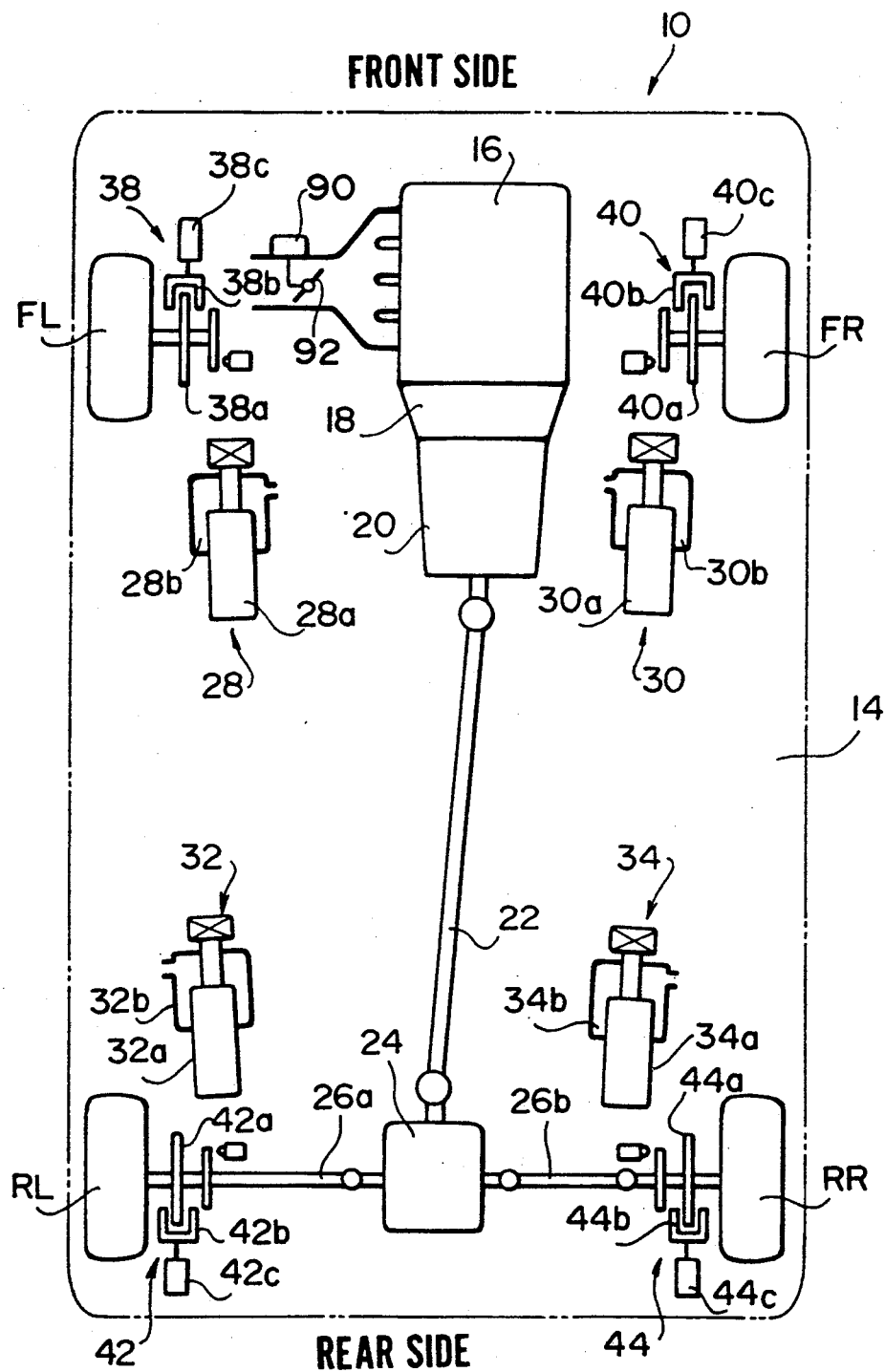
FIG. 1 is a schematic plan view showing a basic arrangement of an embodiment of a vehicle having a slip suppressing device and a suspension control device according to the present invention.

A case will be described below with reference to FIGS. 1 to 6 wherein an embodiment of a vehicle having a slip suppressing device and a suspension control device according to the present invention is applied to a front-engine, rear-drive vehicle.

An arrangement of an embodiment of a vehicle 10 equipped with a brake system 12 serving as a slip suppressing device and a suspension control device 36 for controlling a suspension state of a vehicle body 14 will be briefly described below with reference to FIG. 1.

The vehicle 10 is a front-engine, rear-drive vehicle, and comprises the vehicle body 14, an engine 16 mounted in a front portion of the vehicle body 14, front left and right wheels FL and FR steered by a steering wheel (not shown), and rear left and right wheels RL and RR which are rotated by a driving force of the engine 16.

A rotating force (driving force) of the engine 16 is transmitted to a propeller shaft 22 through a clutch 18 and a transmission 20. The rotating force of the engine 16 is input to a differential gear mechanism 24 through the propeller shaft 22. The input rotating force is split into left and right forces by the differential gear mechanism 24 and the left and right forces are output to rear left and right wheel shafts 26a and 26b. These rear wheel shafts 26a and 26b are rotated by the rotating force. Upon rotation of these rear wheel shafts 26a and 26b, the rear left and right wheels (driving wheels) RL and RR are rotated. As the vehicle body 14 travels upon rotation of the driving wheels RL and RR, the front left and right wheel (driven wheels) FL and FR are rotated in a driven state through an engagement with a road surface.

Passive type suspension devices 28, 30, 32, and 34 for elastically suspending the vehicle body 14 with respect to the wheels FL, FR, RL, and RR are respectively inserted between the front left and right wheels FL and FR and the vehicle body 14 and between the rear left and right wheels RL and RR and the vehicle body 14.

Each of these passive type suspension devices 28, 30, 32, and 34 can switch its damping factor characteristic between two modes, i.e., hard and soft modes. The devices 28, 30, 32, and 34 respectively comprise dampers $28a$, $30a$, $32a$, $34a$, the lower ends of which are connected to the corresponding axles, and air spring devices $28b$, $30b$, $32b$, and $34b$ which are arranged at upper portions of the dampers $28a$, $30a$, $32a$, and $34a$, serve as vehicle height adjusting means, and upper ends of which are fixed to the vehicle body 14.

Figure 2:
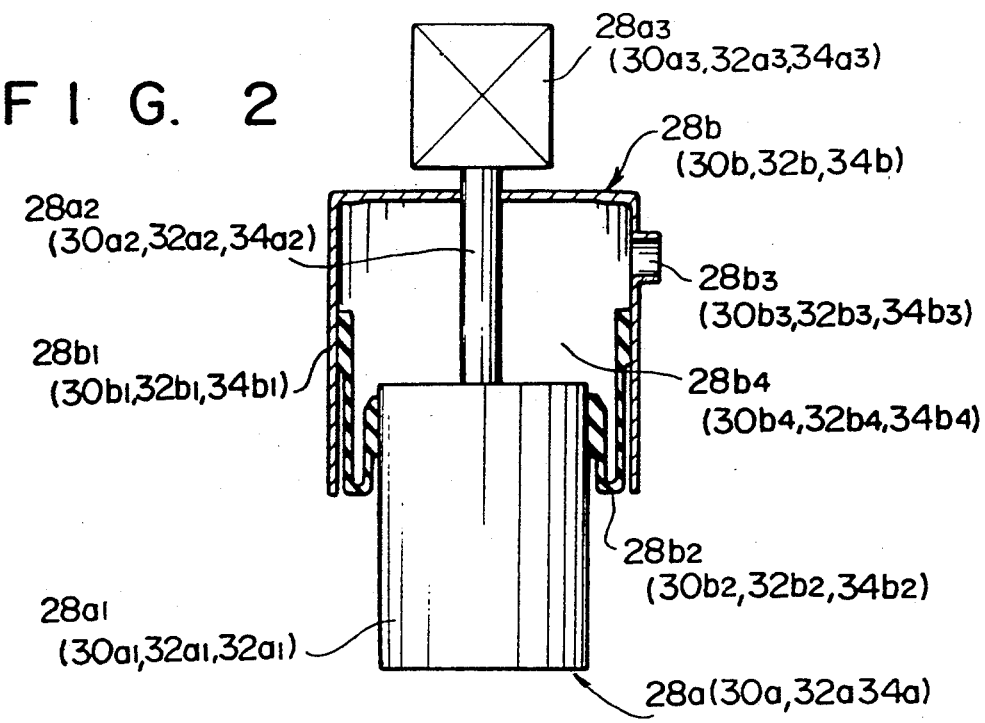
FIG. 2 is a schematic sectional view of an arrangement of an air spring device used in a suspension device equipped in the vehicle shown in FIG. 1.

As shown in FIG. 2, the dampers $28a$, $30a$, $32a$, and $34a$ respectively comprise damper bodies $28a_1$, $30a_1$, $32a_1$, and $34a_1$, control rods $28a_2$, $30a_2$, $32a_2$, and $34a_2$ which are fitted in the corresponding damper bodies $28a_1$, $30a_1$, $32a_1$, and $34a_1$, each of which sets a hard damping factor characteristic when its fitting amount is small and sets a soft damping factor characteristic when its fitting amount is large, and stepping motors $28a_3$, $30a_3$, $32a_3$, and $34a_3$ for defining the fitting amounts of the corresponding control rods $28a_2$, $30a_2$, $32a_2$, and $34a_2$. Note that the rotational driving amounts of these stepping motors $28a_3$, $30a_3$, $32a_3$, and $34a_3$, i.e., the fitting amounts of the control rods $28a_2$, $30a_2$, $32a_2$, and $34a_2$ are electrically controlled by the suspension control device 36 (to be described in detail later).

As shown in FIG. 2, the air spring devices $28b$, $30b$, $32b$, and $34b$ respectively comprise cylinder bodies $28b_1$, $30b_1$, $32b_1$, and $34b_1$ which are loosely fitted on the upper end portions of the corresponding damper bodies $28a_1$, $30a_1$, $32a_1$, and $34a_1$ and upper ends of which are closed, bellows $28b_2$, $30b_2$, $32b_2$, and $34b_2$ for elastically closing gaps between the cylinder bodies $28b_1$, $30b_1$, $32b_1$, and $34b_1$ and the damper bodies $28a_1$, $30a_1$, $32a_1$, and $34a_1$, and compressed air intake ports $28b_3$, $30b_3$, $32b_3$, and $34b_3$ formed in the cylinder bodies $28a_1$, $30a_1$, $32a_1$, and $34a_1$. Compressed air chambers $28b_4$, $30b_4$, $32b_4$, and $34b_4$ are defined by spaces surrounded by the corresponding cylinder bodies $28b_1$, $30b_1$, $32b_1$, and $34b_1$ and the bellows $28b_2$, $30b_2$, $32b_2$, and $34b_2$, respectively.

Compressed air is introduced through the compressed air intake ports $28b_3$, $30b_3$, $32b_3$, and $34b_3$ corresponding to the compressed air chambers $28b_4$, $30b_4$, $32b_4$, and $34b_4$, so that the volumes of the chambers $28b_4$, $30b_4$, $32b_4$, and $34b_4$ are arbitrarily defined. In the air spring devices $28b$, $30b$, $32b$, and $34b$, the spring height, i.e., the vehicle height is defined in accordance with the volumes of the compressed air chambers $28b_4$, $30b_4$, $32b_4$, and $34b_4$. Note that intake amounts of compressed air to the compressed air intake ports $28b_3$, $30b_3$, $32b_3$, and $34b_3$ are pneumatically controlled by the suspension control device 36.

The brake system 12 having a brake function for suppressing a traveling speed of the vehicle 10 and a slip suppressing function for eliminating a slip occurring in the wheels FL, FR, RL, and RR will be described below with reference to FIGS. 1, 3, 4A, and 4B.

More specifically, in the brake system 12, as the characteristic feature of the present invention, as will be described in detail later, when a slip of the rear wheel RL and/or rear wheel RR is detected and a braking force acts on the rear wheel RL and/or rear wheel RR causing the slip to execute the slip suppressing operation, the vehicle height of the vehicle body 14 is increased by the suspension control device 36 (to be described later), and the damping characteristics of the dampers $32a$ and $34a$ of the rear wheels RL and RR are set in the hard mode while the braking force is effective.

Figure 3:
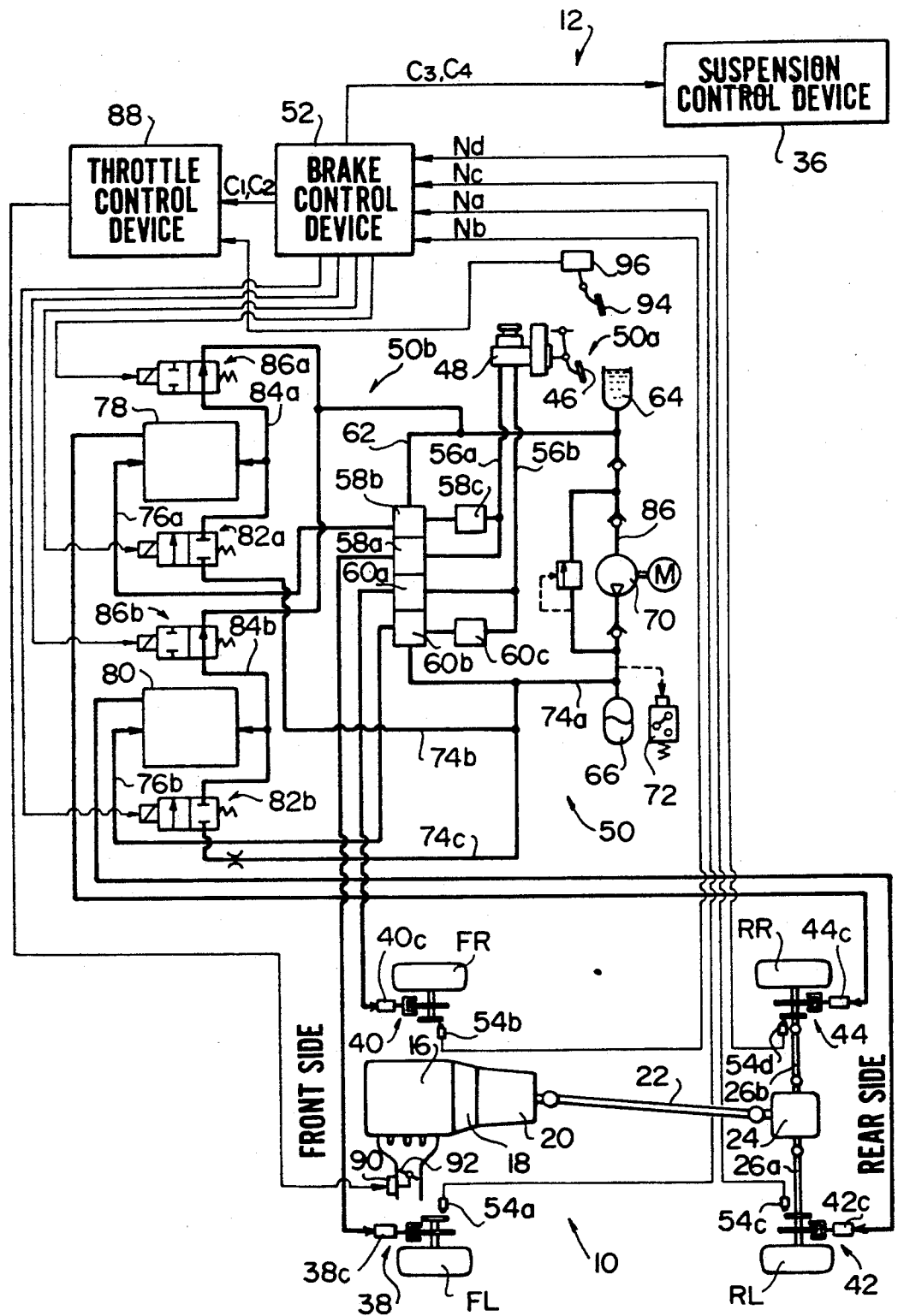
FIG. 3 is a view showing a brake system equipped in the vehicle shown in FIG. 1 together with its hydraulic circuit.

As shown in FIGS. 1 and 3, the brake system 12 comprises brake devices 38, 40, 42, and 44 for independently braking the four wheels FL, FR, RL, and RR by an oil pressure, a brake pedal 46 depressed by a driver (or an operator), a master cylinder 48, one end of which is connected to the brake pedal 46, for generating an oil pressure upon depression of the brake pedal 46, a hydraulic system 50 consisting of an anti-skid brake hydraulic system $50a$ and a slip control brake hydraulic system $50b$ for applying the oil pressure generated by the master cylinder 48 to the brake devices 38, 40, 42, and 44, and a brake control device 52 for controlling a hydraulic operating state in these hydraulic systems $50a$ and $50b$.

The brake control device 52 controls the anti-skid brake hydraulic system $50a$ and the slip control brake hydraulic system $50b$ in a control content (to be described later) according to detection results (lock detection results and slip detection results of the wheels) from rotating speed detection sensors $54a$, $54b$, $54c$, and $54d$, attached to the wheels FL, FR, RL, and RR, for detecting the rotating speeds of the wheels FL, FR, RL, and RR.

The brake devices 38, 40, 42, and 44 comprise brake discs $38a$, $40a$, $42a$, and $44a$ integrally attached to the corresponding wheel shafts, brake pads $38b$, $40b$, $42b$, and $44b$ which can be freely brought into contact with or separated from the brake discs $38a$, $40a$, $42a$, and $44a$, and hydraulic cylinders $38c$, $40c$, $42c$, and $44c$ for pressing the brake pads $38b$, $40b$, $42b$, and $44b$ against the brake discs $38a$, $40a$, $42a$, and $44a$ with predetermined braking forces. Note that the oil pressure of the anti-skid brake hydraulic system $50a$ is partially used as a hydraulic source for the slip control brake hydraulic system.

In this embodiment, more specifically, the brake control device 52 defines one constituting element of a slip suppressing control means which discriminates a slip state of the vehicle 10, executes by itself a slip suppressing operation when a slip ratio is large, and causes a throttle control device 88 (to be described later) to perform the slip suppressing operation when the slip ratio is small.

The hydraulic circuit of the anti-skid brake hydraulic system $50a$ will be briefly described below with reference to FIG. 3.

This hydraulic circuit has a dual hydraulic piping system constituted by a first hydraulic pipe line $56a$, connected to the master cylinder 48, for supplying an oil pressure to the front left wheel FL and the rear right wheel RR, and a second hydraulic pipe line $56b$, connected to the master cylinder 48, for supplying an oil pressure to the front right wheel FR and the rear left wheel RL. The first hydraulic pipe line $56a$ is connected to a front-wheel first valve $58a$ for applying an oil pressure to the front left wheel FL, a rear-wheel first valve $58b$ for applying an oil pressure to the rear right wheel RR, and a first oil pressure control valve $58c$ for decreasing the oil pressure supplied to the rear-wheel first valve $58b$ at a predetermined rate. The second hydraulic pipe line $56b$ is connected to a front-wheel second valve $60a$ for applying an oil pressure to the front right wheel FR, a rear-wheel second valve $60b$ for applying an oil pressure to the rear left wheel RL, and a second oil pressure control valve $60c$ for decreasing the oil pressure supplied to the rear-wheel second valve $60b$ at a predetermined rate.

The valves $58a$, $58b$, $60a$, and $60b$ are connected to a reservoir tank 64 through a drain oil path 62. The reservoir tank 64 is connected to an accumulator 66 through a hydraulic pipe line 68. A pump 70 for pressurizing a brake oil returned into the reservoir tank 64 is arranged midway along the hydraulic pipe line 68. The brake oil pressurized by the pump 70 is stored in the accumulator 66 while being accumulated. A pressure switch 72 is connected at the upstream side of the accumulator 66. The switch 72 adjusts an operation of the pump 70 to obtain a preset pressure of the brake oil pressurized by the pump 70. The accumulator 66 is connected so that its hydraulic force is transmitted to the valves 58a, 58b, 60a, and 60b through a transmission pipe 74a.

In this anti-skid brake hydraulic system 50a, the valves 58a, 58b, 60a, and 60b receive the oil pressure of the master cylinder in a normal state (i.e., in a state wherein a lock state of the wheels is not detected). In this state, the brake is actuated on the basis of the oil pressure from the master cylinder 48. Output signals (rotating speed detection signals of the wheels) from the rotating speed detection sensors 54a, 54b, 54c, and 54d are input to the brake control device 52, and when the lock state of any of the wheels FL, FR, RL, and RR is detected, an anti-skid mode is set.

When the anti-skid mode is set, the brake control device 52 outputs a control signal for switching the valves 58a, 58b, 60a, and 60b one of which corresponds to the locked wheel from a state for receiving the oil pressure from the master cylinder 48 to a state for receiving the oil pressure from the accumulator 66. As a result, the locked wheel receives a low oil pressure from the accumulator 66, thus canceling the lock state of the wheel. Note that in the anti-skid mode, the brake oil which is to be applied from the master cylinder 48 to the valve corresponding to the locked wheel is temporarily stored in the reservoir tank 64 through the drain oil path 62 described above. In this embodiment, since the brake control device 52 is arranged as described above, the wheels FL, FR, RL, and RR can be reliably prevented from being locked.

The slip control brake hydraulic system 50b utilizes the oil pressure of the anti-skid brake hydraulic system 50a. More specifically, the system 50b performs the slip suppressing control using an oil pressure of the brake oil reserved in the accumulator 66.

The hydraulic circuit of the slip control brake hydraulic system 50b comprises a first variable brake pressure actuator 78, inserted in a first hydraulic pipe line 76a for connecting the rear-wheel first valve 58b and the brake device 44 for the rear right wheel, for adjusting a brake pressure applied to the brake device 44, a second variable brake pressure actuator 80, inserted in a second hydraulic pipe line 76b for connecting the rear-wheel second valve 60b and the brake device 42 for the rear left wheel, for adjusting a brake pressure applied to the brake device 42, a first feed-oil solenoid valve 82a, inserted in a second transmission pipe 74b for connecting the accumulator 66 and the first variable brake pressure actuator 78, for turning on/off introduction of a brake oil reserved in the accumulator 66 to the first variable brake pressure actuator 78, and a second feed-oil solenoid valve 82b, inserted in a third transmission path 74c for connecting the accumulator 66 and the second variable brake pressure actuator 80, for turning on/off introduction of a brake oil reserved in the accumulator 66 to the second variable brake pressure actuator 80.

Note that a first drain-oil solenoid valve 86a for draining a remaining brake oil introduced into the first variable brake pressure actuator 78 to the drain oil path 62 is inserted in a first drain oil path 84a for connecting the drain oil path 62 and a portion of the second transmission pipe 74b located between the first feed-oil solenoid valve 82a and the first variable brake pressure actuator 78. A second drain-oil solenoid valve 86b for draining a remaining brake oil introduced into the second variable brake pressure actuator 80 to the drain oil path 62 is inserted in a second drain oil path 84b for connecting the drain oil path 62 and a portion of the third transmission pipe 74c located between the second feed-oil solenoid valve 82b and the second variable brake pressure actuator 80.

Note that the first and second feed-oil solenoid valves 82a and 82b, and the first and second drain-oil solenoid valves 86a and 86b are connected to and driven by the brake control device 52. More specifically, the first and second feed-oil solenoid valves 82a and 82b are normally closed, and are opened upon inputting of the control signal from the brake control device 52. On the other hand, the first and second drain-oil solenoid valves 86a and 86b are normally open, and are closed upon inputting of the control signal from the brake control device 52.

Figure 4A:
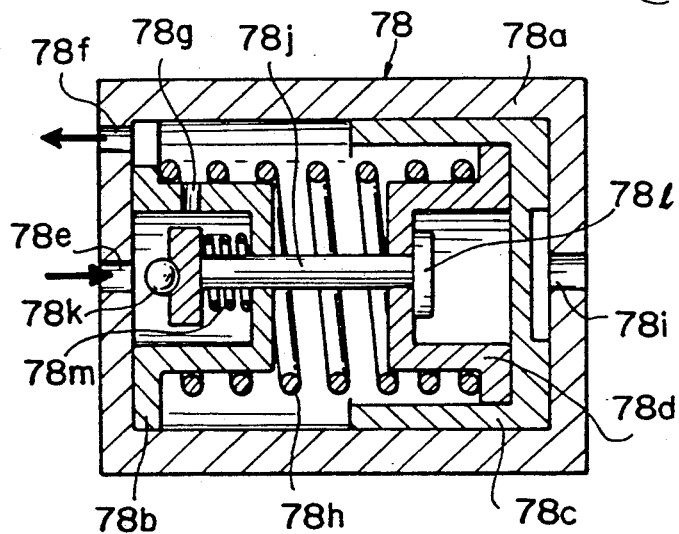
FIG. 4A is a sectional view showing a normal state of an arrangement of a variable brake pressure actuator used in the brake system shown in FIG. 3.

As shown in FIG. 4A, the first variable brake pressure actuator 78 comprises a main cylinder 78a as a casing, a first sub cylinder 78b fixed in a left portion in the main cylinder 78a in FIG. 4A and having a smaller diameter as that of the main cylinder 78a, a cylindrical piston 78c slidably inserted in the main cylinder 78a and deviated to the right in FIG. 4A, and a second sub cylinder 78d fixed in a right portion in the piston 78c in FIG. 4A and having a smaller diameter than that of the piston 78c. An input port 78e connected to an upstream portion (on the side of the rear-wheel first valve 58b) of the first hydraulic pipe line 76a is formed in the central portion of the left side surface of the main cylinder 78a. An output port 78f connected to a downstream portion (on the side of the brake device 44) of the first hydraulic pipe line 76a is formed in the peripheral portion of the left side surface of the cylinder 78a. A communication hole 78g for causing an inner space of the first sub cylinder 78b to communicate with an inner space of the main cylinder 78a is formed in the peripheral wall portion of the first sub cylinder 78b. With this structure, unless the input port 78e is closed, the brake oil from the rear-wheel first valve 58b is introduced into the brake device 44 while its pressure is left unchanged.

In the first variable brake pressure actuator 78, the second sub cylinder 78d is biased by a first coil spring 78h by a predetermined biasing force so that the left end face of the piston 78c abuts against the right inner side surface of the main cylinder 78a. A pressurizing port 78i connected to the end portion of the second transmission pipe 74b is formed in the central portion of the right side surface of the main cylinder 78a. A control rod 78j is disposed in the main cylinder 78a, so that its left end slidably extends through the first sub cylinder 78b, and its right end slidably extends through the second sub cylinder 78d. A valve body 78k capable of closing the input port 78e is attached to the left end of the control rod 78j, and a regulating segment 78l is attached to the right end of the rod 78j. The regulating segment 78l is engaged with the left side surface of the second sub cylinder 78d in a normal state so that the valve body 78k is separated from the input port 78e to open it. The control rod 78j is biased by a second coil spring 78m to be deviated to the left in FIG. 4A.

Figure 4B:
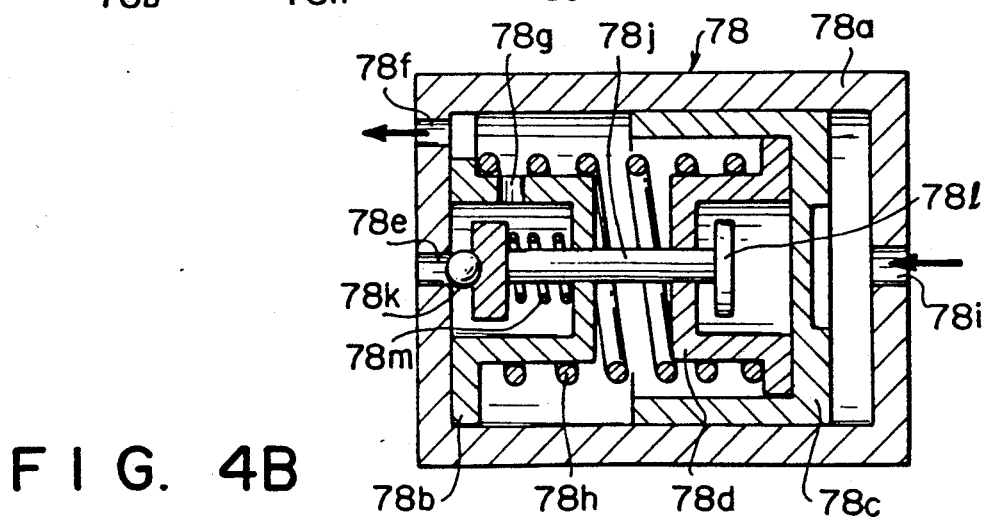
FIG. 4B is a sectional view showing a brake pressurized state of the arrangement of the variable brake pressure actuator shown in FIG. 4A.

In the first variable brake pressure actuator 78 with the above structure, since the input port 78d is open in a normal state, as described above, a brake oil from the rear-wheel first valve 58b is introduced into the brake device 44 while its pressure is left unchanged. On the other hand, when a brake oil from the accumulator 66 is applied through the pressurizing port 78i, the piston 78c is deviated to the left in FIG. 4A by the pressure of this brake oil against the biasing force of the first spring 78h. Upon this deviation, as shown in FIG. 4B, the valve body 78k closes the input port 78e, and reduces the volume in the main cylinder 78a. As a result, the pressure of the brake oil output from the output port 78f corresponds to that obtained by further increasing the pressure introduced from the rear-wheel first valve 58b in accordance with the reduction in volume.

Therefore, in the normal state (a state wherein the brake control device 52 does not detect a slip of the rear wheels RL and RR), an oil pressure from the master cylinder 48 is introduced to the rear-wheel brake devices 42 and 44 through the first and second hydraulic pipe lines 76a and 76b. On the other hand, when the output signals indicating the rotating speeds of the wheels FL, FR, RL, and RR from the rotating speed detection sensors 54a, 54b, 54c, and 54d are input to the brake control device 52 and the device 52 detects a slip of the rear wheel RL and/or rear wheel RR, the brake control device 52 outputs a control signal to the first feed-oil solenoid valve 82a and the first drain-oil solenoid valve 86a and/or the second feed-oil solenoid valve 82b and the second drain-oil solenoid valve 86b. As a result, a brake oil from the accumulator 66 in the anti-skid brake hydraulic system 50a is introduced into one or both of the first and second variable brake pressure actuators 78 and 80. Thus, the brake oil in one or both of the first and second variable brake pressure actuators 78 and 80 is pressurized, and an oil pressure to be supplied to one or both of the brake devices 42 and 44 for the rear left and right wheels is further increased. In this manner, the rotating force of one or both of the rear wheels RL and RR is braked, and the slip of one or both of the rear wheels RL and RR is suppressed.

When the slip state is eliminated by the slip suppressing control operation (in practice, the slip ratio SL of the rear wheels RL and RR is decreased to 0.1% or less), a brake pressure recovery operation is started. When the brake pressure recovery operation is started, outputting of the control signal from the brake control device 52 is stopped, one or both of the first and second feed-oil solenoid valves 82a and 82b are closed, and one or both of the first and second drain-oil solenoid valves 86a and 86b are opened. As a result, in one or both of the first and second variable brake pressure actuators 78 and 80, introduction of the brake oil from the accumulator 66 to one or both of the pressurizing ports 78i and 80i is stopped. Thus, one or both of the input ports 78e and 80e are opened, and an oil pressure from the master cylinder 48 is applied to one or both of the first and second variable brake pressure actuators 78 and 80. More specifically, the oil pressure supplied to one or both of the brake devices 42 and 44 for the rear left and right wheels is recovered to an original value, i.e., a pressure without a braking force. In this manner, the braking state of the rotating force of one or both of the rear wheels RL and RR is canceled. Therefore, one or both of the rear wheels RL and RR are rotated by the rotating force of the engine 16 without being braked.

In this embodiment, when it is determined on the basis of the rotating speed detection sensors 54a, 54b, 54c, and 54d that the degree of slip (slip ratio SL) of the rear left and right wheels RL and RR falls in a small first slip discrimination range (i.e., 0.1%<SL<0.2%), the brake control device 52 outputs a slip suppress signal C$_1$ to the throttle control device 88. Upon reception of this slip suppress signal C$_1$, the throttle control device 88 controls a throttle open/close actuator 90 to decrease an opening of a throttle valve 92. In other words, a first slip suppressing control operation for suppressing a slip by decreasing an engine output is carried out. In this embodiment, the throttle control device 88 defines the other constituting element of the slip suppressing control means.

When the slip ratio is increased to a large second slip discrimination range (i.e., SL≧0.2%), the brake control device 52 outputs the above-mentioned slip suppress signal C$_1$ to the throttle control device 88, and also outputs the control signal for activating the slip control brake hydraulic pressure system 50b. Thus, a second slip suppressing control operation for decreasing the rotating force of the rear wheels RL and RR to suppress a slip is performed by brake control by the brake control device 52 together with the first slip suppressing control operation by throttle control.

The throttle control device 88 receives an accelerator signal from an accelerator opening sensor 96 for detecting a depression amount of an accelerator pedal 94. Based on this accelerator signal, the throttle control device 88 outputs a throttle control signal to the throttle open/close actuator 92 for adjusting the opening of the throttle valve 92. That is, the opening of the throttle valve 92 is electrically controlled according to the depression amount of the accelerator pedal 94, thereby adjusting the output of the engine 16.

A control sequence of the slip suppressing control operation by the brake control device 52 and the throttle control device 88 will be briefly described below.

The brake control device 52 receives the rotating speed detection signals (a signal N$_a$ indicating a rotating speed a and a signal N$_b$ indicating a rotating speed b) from the rotating speed detection sensors 54a and 54b for detecting the rotating speeds of the front left and right wheels FL and FR, and the rotating speed detection signals (a signal N$_c$ indicating a rotating speed c and a signal N$_d$ indicating a rotating speed d) from the rotating speed detection sensors 54c and 54d for detecting the rotating speeds of the rear left and right wheels RL and RR. The brake control device 52 calculates differences in rotating speeds of the front wheels (driven wheels) FL and FR and the rear wheels (driving wheels) RL and RR, and calculates the slip ratio of the rear wheels RL and RR.

More specifically, two values SL$_1$ and SL$_2$ obtained by the following two equations (1) and (2) are compared with each other, and the slip ratio SL is defined by a larger one of the values SL$_1$ and SL$_2$, as shown in equation (3). SL$_1$ is the slip ratio defined by an average value a+b/2) of the rotating speeds of the front wheels FL and FR and the rotating speed c of the rear left wheel RL, and SL$_2$ is the slip ratio defined by an average value (a+b/2) of the rotating speeds of the front wheels FL and FR and the rotating speed d of the rear right wheel RR.

$$SL_1 = \{c - (a+b)/2\} \div (a+b)/2 \times 100 \quad (1)$$

$$SL_2 = \{d - (a+b)/2\} \div (a+b)/2 \times 100 \quad (2)$$

$$SL = Max(SL_1, SL_2) \quad (3)$$

The brake control device 52 outputs a signal indicating the calculated slip ratio SL to the throttle control device 88. When the calculated slip ratio SL is below the predetermined first slip discrimination range, the brake control device 52 determines that the detected slip state is not an abnormal slip state, and is one steadily generated in the driving wheels, and does not execute the slip suppressing control operation. However, when the slip ratio SL falls within the first slip discrimination range, the device 52 outputs the slip suppress signal $C_1$ to the throttle control device 88 to feedback-control (throttle-control) the opening of the throttle valve 92, so that the slip ratio is decreased to 0.1% or less.

When the slip ratio SL falls within the second slip discrimination range, the brake control device 52 outputs the slip suppress signal $C_1$ to the throttle control device 88 to execute the first slip suppressing control operation in which the opening of the throttle valve 92 is feedback-controlled (throttle-controlled) through the throttle control device 88, and executes the second slip suppressing control operation for feedback-controlling (brake-controlling) the operations of the brake devices 42 and 44 for the rear left and right wheels, so that the slip ratio is decreased to 0.1% or less.

When the second slip suppressing control operation is executed and the detected slip ratio SL is decreased to 0.1% or less, the brake control device 52 outputs a slip suppress inhibit signal $C_2$ to the throttle control device 88 so as to inhibit the slip suppressing control operation. Upon reception of the slip suppress inhibit signal $C_2$, the throttle control device 88 outputs a control signal to stop the first slip suppressing control operation.

As described above, in this embodiment, the brake control device 52 and the throttle control device 88 are arranged as the slip control means for discriminating a traveling state of a vehicle and performing slip control. During slip control by the brake control device 52, a suspension control signal $C_3$ is output from the brake control device 52 to the suspension control device 36 to control the behavior of the suspension devices 28, 30, 32, and 34 so as to eliminate the so-called squat phenomenon in which the rear portion of the vehicle body 14 squats. When the brake control device 52 executes the above-mentioned slip suppressing control operation and the detected slip ratio SL is decreased to 0.1% or less, it outputs a suspension control inhibit signal $C_4$ to the suspension control device 36 so that the suspension devices 28, 30, 32, and 34 are recovered to original states (states immediately before the suspension control operation accompanied by actuation of the brake in slip suppressing control is performed).

Figure 5:
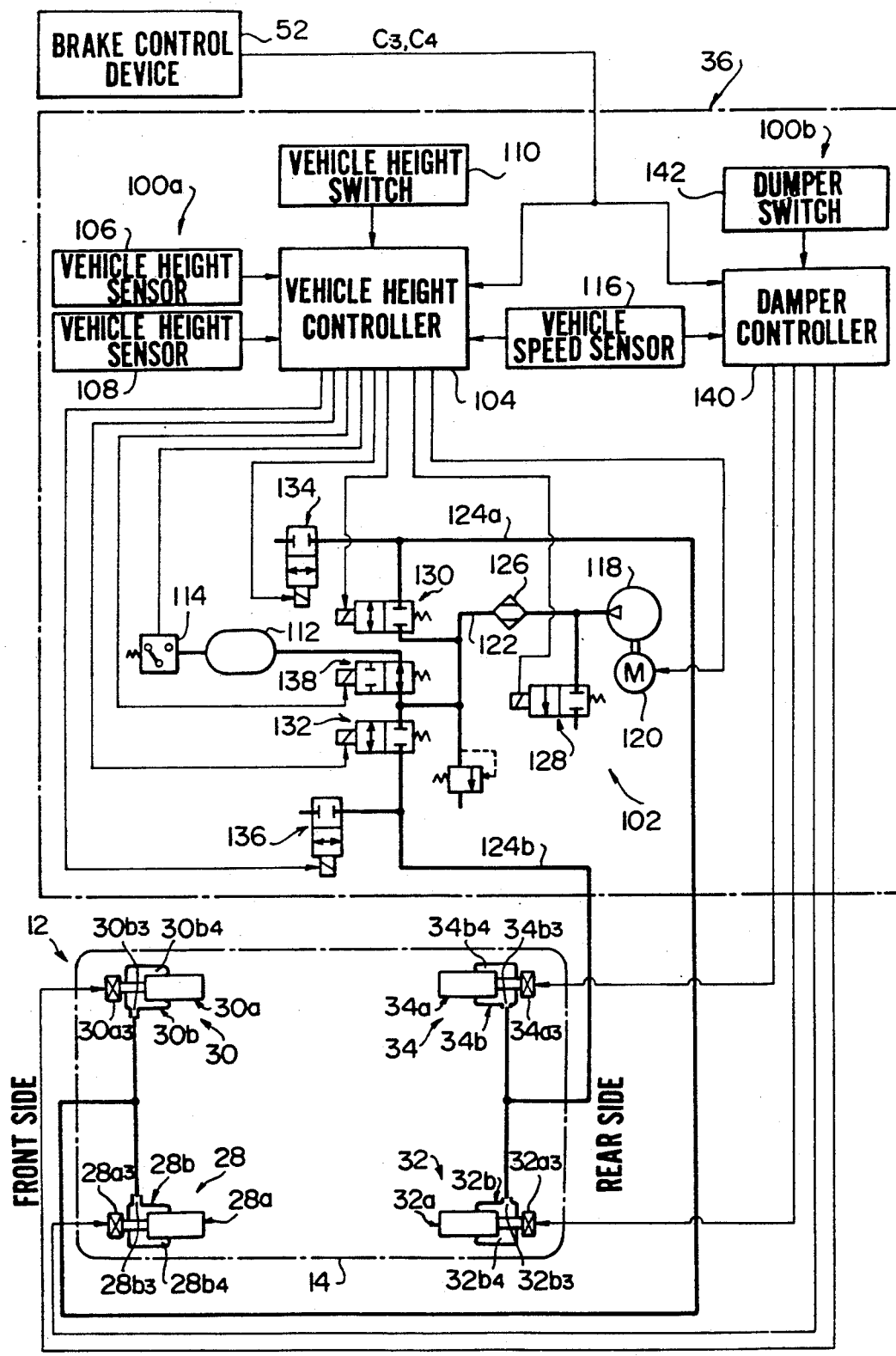
FIG. 5 is a circuit diagram showing an arrangement of the suspension control device for controlling the suspension state of the vehicle shown in FIG. 1.
Figure 6:
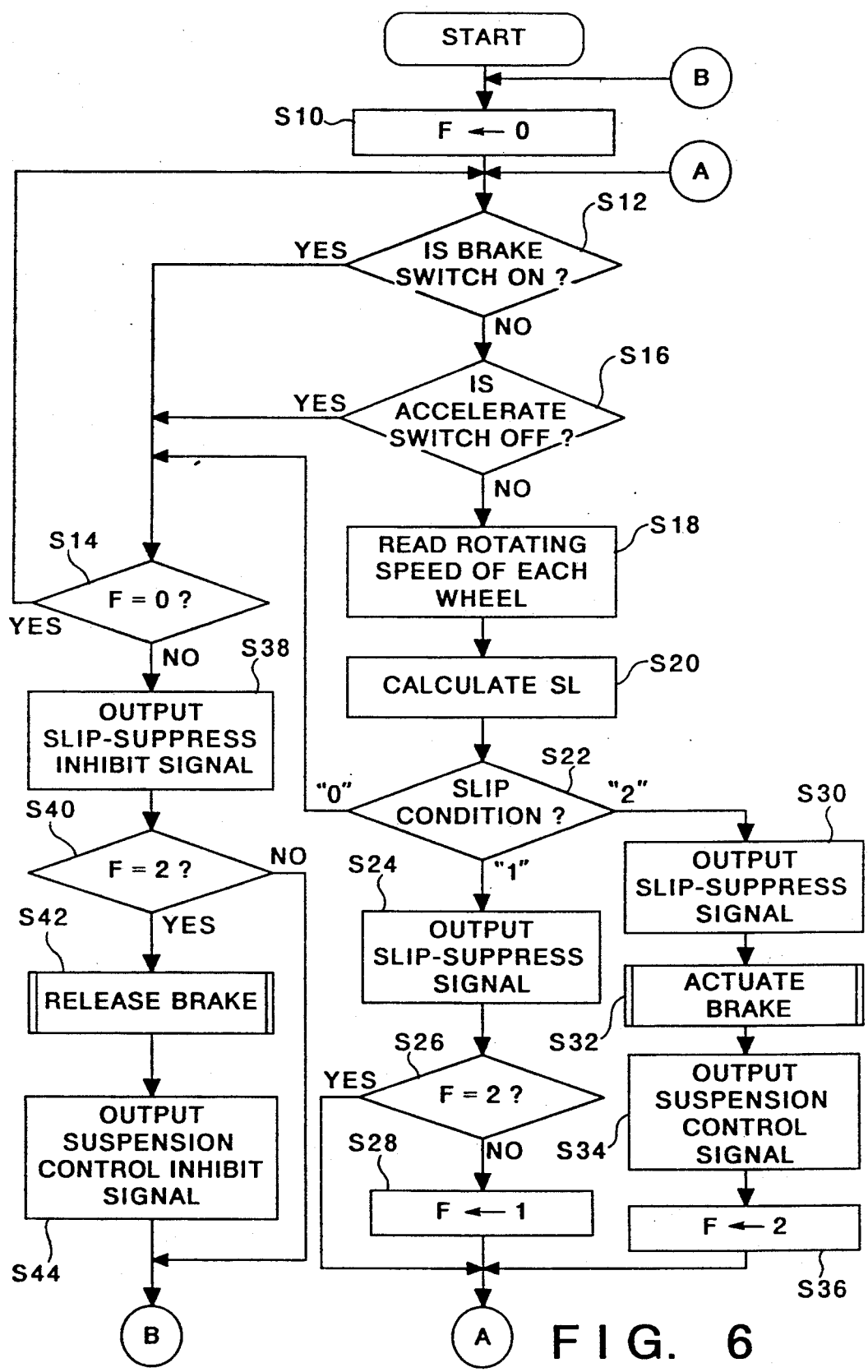
FIG. 6 is a flow chart for explaining a control sequence for suppressing a slip and preventing a squat phenomenon in a brake control device shown in FIG. 3.

The suspension control device 36 for controlling the suspension state of the vehicle body 14, in other words, for drive-controlling the suspension devices 28, 30, 32, and 34 will be described below with reference to FIGS. 5 and 6.

The suspension control device 36 comprises two systems, i.e., a damper control system 100a for outputting a control signal to the stepping motors $28a_3$, $30a_3$, $32a_3$, and $34a_3$ in the dampers 28a, 30a, 32a, and 34a, and a vehicle height control system 100b for applying working compressed air into the air chambers $28b_4$, $30b_4$, $32b_4$, and $34b_4$ in the air spring devices 28b, 30b, 32b, and 34b.

The vehicle height control system 100b comprises a pneumatic mechanism for introducing working compressed air into the air chambers $28b_4$, $30b_4$, $32b_4$, and $34b_4$ and exhausting compressed air from the air chambers $28b_4$, $30b_4$, $32b_4$, and $34b_4$ to an external portion, and a vehicle height controller 104 for electrically controlling the pneumatic mechanism 102. The vehicle height controller 104 is connected to a vehicle height sensor 106 for detecting a vehicle height at the front wheel side, a vehicle height sensor 108 for detecting a vehicle height at the rear wheel side, a vehicle height switch 110 for switching an automatic/manual vehicle height adjusting operation, a pressure switch 114 for maintaining a pressure in a reservoir tank 112 (to be described later) at a predetermined pressure, a vehicle speed sensor 116 for detecting a vehicle speed of the vehicle 10, and the above-mentioned brake control device 52.

The pneumatic mechanism 102 comprises a compressor 118, a motor 120 for driving the compressor 118, a common air path 122 connected to the compressor 118, and first and second branch air paths 124a and 124b branching from the common air path 122 and connected to the compressed air intake ports $28b_3$ and $30b_3$ for the front wheels FL and FR and the compressed air intake ports $32b_3$ and $34b_3$ for the rear wheels RL and RR. A drier 126 for drying compressed air passing through the common air path 122 is inserted in the path 122, and a first exhaust solenoid valve 128 for exhausting compressed air to the air chambers $28b_4$, $30b_4$, $32b_4$, and $34b_4$ of the four wheels FL, FR, RL, and RR is connected to the path 122. The first exhaust solenoid valve 128 is normally closed, and is energized upon reception of the control signal from the vehicle height controller 104 to be opened.

A normally closed first open/close solenoid valve 130 is inserted in the first branch air path 124a, and a normally closed second open/close solenoid valve 132 is inserted in the second branch air path 124b. These first and second open/close solenoid valves 130 and 132 are energized upon reception of the control signal from the vehicle height controller 104 to be opened.

A normally closed second exhaust solenoid valve 134 for exhausting compressed air in the air chambers $28b_4$ and $30b_4$ in the air spring devices 28b and 30b for the front left and right wheels to an external portion is connected at a portion of the first branch air path 124a at the downstream side of the first open/close solenoid valve 130. A normally closed third exhaust solenoid valve 136 for exhausting compressed air in the air chambers $32b_4$ and $34b_4$ in the air spring devices 32b and 34b for the rear left and right wheels to an external portion is connected at a portion of the second branch air path 124b at the downstream side of the second open/close solenoid valve 132. These second and third exhaust solenoid valves 134 and 136 are energized upon reception of the control signal from the vehicle height controller 104 to be opened.

Furthermore, the reservoir tank 112 is connected to a portion of the second branch air path 124b at the upstream side of the second open/close solenoid valve 130 through a third open/close solenoid valve 138. The third open/close solenoid valve 138 is energized upon reception of a control signal from the height controller 104 to be closed.

When the first open/close solenoid valve 130 is opened and the second exhaust solenoid valve 134 is closed, working compressed air from the compressor 118 and the reservoir tank 112 is introduced into the front-wheel air chambers $28b_4$ and $30b_4$, and the corresponding bellows $28b_2$ and $30b_2$ expand. As a result, a high vehicle height can be obtained in the front portion of the vehicle body 14. When the first open/close solenoid valve 130 is closed and the second exhaust solenoid valve 134 is opened, the working compressed air is exhausted from the front-wheel air chambers $28b_4$ and $30b_4$, and the corresponding bellows $28b_2$ and $30b_2$ contract. As a result, a low vehicle height can be obtained in the front portion of the vehicle body 14.

On the other hand, when the second open/close solenoid valve 132 is opened and the third exhaust solenoid valve 135 is closed, working compressed air is introduced from the compressor 118 and the reservoir tank 112 to the rear-wheel air chambers $32b_4$ and $34b_4$, and the corresponding bellows $32b_2$ and $34b_2$ expand. As a result, a high vehicle height can be obtained in the rear portion of the vehicle body 14. When the second open/close solenoid valve 132 is closed and the third exhaust solenoid valve 136 is opened, the working compressed air is exhausted from the rear-wheel air chambers $32b_4$ and $34b_4$, and the corresponding bellows $32b_2$ and $34b_2$ contract. As a result, a low vehicle height can be obtained in the rear portion of the vehicle body.

The above-mentioned vehicle height switch 110 has three setting positions, i.e., an automatic mode setting position, a manual low vehicle height setting position, and a manual high vehicle height setting position. Assuming that an automatic mode is selected by the vehicle height switch 110, when the above-mentioned vehicle height controller 104 determines on the basis of the vehicle speed detected by the vehicle speed sensor 116 that the detected vehicle speed is in a low-speed state, it outputs a control signal so that the entire vehicle height of the vehicle body 14 (i.e., the vehicle heights of the front and rear portions of the vehicle body) is set to be high. On the other hand, when it is determined that the detected vehicle speed is a high-speed state, the controller 104 outputs a control signal so that the entire vehicle height of the vehicle body 14 is set to be low. When a manual low vehicle height mode is selected by the vehicle height switch 110, the vehicle height controller 104 outputs a control signal so that the entire height of the vehicle body 14 is set to be low regardless of the detected vehicle speed. When a manual high vehicle height mode is selected by the vehicle height switch 110, the controller 104 outputs a control signal so that the entire height of the vehicle body 14 is set to be high regardless of the detected vehicle speed.

When the above-mentioned vehicle height controller 104 receives the suspension control signal $C_3$ from the brake control device 52, it outputs a control signal so that the second open/close solenoid valve 132 is opened and the third exhaust solenoid valve 136 is closed. As a result, a high vehicle height is set in the rear portion of the vehicle body 14, as described above. When the vehicle height controller 104 receives the suspension control inhibit signal $C_4$, it outputs a control signal so that the second open/close solenoid valve 132 is closed and the third exhaust solenoid valve 136 is opened. As a result, a low vehicle height is set in the rear portion of the vehicle body, as described above.

The damper control system 100a described above comprises a damper controller 140, connected to the stepping motors $28a_3$, $30a_3$, $32a_3$, and $34a_3$ in the dampers 28a, 30a, 32a, and 34a, for outputting a control signal for switching a damping characteristic of the dampers 28a, 30a, 32a, and 34a in the soft/hard mode to the stepping motors $28a_3$, $30a_3$, $32a_3$, and $34a_3$. The damper controller 140 is connected to a damper switch 142, the vehicle speed sensor 116, and the brake control device 52 described above. The damper switch 142 is arranged to automatically/manually switch the damping characteristics of the dampers 28a, 30a, 32a, and 34a.

The damper switch 142 has three setting positions, i.e., an automatic mode setting position, a manual soft setting position, and a manual hard setting position. Assuming that an automatic mode is selected by the damper 142, when the damper controller 140 determines on the basis of the vehicle speed detected by the vehicle speed sensor 116 that the detected vehicle speed is in a low-speed state, it outputs a control signal so that the damping characteristics of the dampers 28a and 30a of the front wheels FL and FR are set in the soft mode, and the damping characteristics of the dampers 32a and 34a of the rear wheels RL and RR are set in the hard mode. Thus, an understeer tendency of steering characteristics is weakened to improve turning operability in a low-speed state. When it is determined that the detected vehicle speed is in a high-speed state, the damper controller 140 outputs a control signal so that the damping characteristics of the dampers 28a and 30a of the front wheels FL and FR are set in the hard mode, and the damping characteristics of the dampers 32a and 34a of the rear wheels RL and RR are set in the soft mode. Thus, an understeer tendency of the steering characteristics is enhanced to improve straight traveling stability.

When a manual hard mode is selected by the damper switch 142, the damper controller 140 outputs a control signal so that the damping characteristics of the four dampers 28a, 30a, 32a, and 34a are set in the hard mode regardless of the detected vehicle speed. When a manual soft mode is selected by the damper switch 142, the damper controller 140 outputs a control signal so that the damping characteristics of the four dampers 28a, 30a, 32a, and 34a are set in the soft mode regardless of the detected vehicle speed.

When the damper controller 140 receives the suspension control signal $C_3$ from the brake control device 52, it outputs a control signal to fix the damping characteristics of the rear-wheel dampers 32a and 34a in the hard mode of the setting states of the damping characteristics. When the damper controller 140 receives the suspension control inhibit signal $C_4$, it outputs a control signal so that the damping characteristics of the rear-wheel dampers 32a and 34a are recovered to states before the slip suppressing control operation starts.

An operation of the suspension control device 36 will be described in detail below.

When one or both of the vehicle heights of the front and rear portions of the vehicle body 14 are to be increased, the vehicle height controller 104 outputs a control signal so that one or both of the second and third front-wheel exhaust valves 134 and 136 are closed, and one or both of the first and second open/close valves 130 and 132 are opened. As a result, working compressed air is supplied to one or both of the first and second open/close valves 130 and 132 from the compressor 118 through the drier 126 or from the reservoir tank 112 through the opened third open/close solenoid valve 138. The working compressed air is also supplied to the front-wheel air spring devices 28b and 30b and/or the rear-wheel air spring devices 32b and 34b through the first open/close valve 130 and/or the second open/close valve 132. In this manner, the front-wheel air spring devices 28b and 30b and/or the rear-wheel air spring devices 32b and 34b increase the vehicle height of the front portion and/or the rear portion of the vehicle body 14.

On the other hand, when one or both of the vehicle heights of the front and rear portions of the vehicle body 14 are to be decreased, the vehicle height controller 104 outputs a control signal so that one or both of the first and second open/close valves 130 and 132 are closed and one or both of the second and third front-wheel exhaust valves 134 and 136 are opened. As a result, the compressed air in the front-wheel air spring devices 28b and 30b and/or the rear-wheel air spring devices 32b and 34b are/is exhausted to an external portion through the second front-wheel exhaust valve 134 and/or the third front-wheel exhaust valve 136 without going through the drier 126. In this manner, the front-wheel air spring devices 28b and 30b and/or the rear-wheel air spring devices 32b and 34b decrease the vehicle height of the front portion and/or the rear portion of the vehicle body 14.

The control sequence in the brake control device 52 for activating vehicle height and damper damping characteristic control in the suspension control device 36 during the slip control operation will be described below with reference to the flow chart shown in FIG. 6.

When an ignition switch (not shown) is turned on, this control sequence is automatically started, and is intermittently executed until the ignition switch is turned off.

In step S10, a flag F indicating a hysteresis of the slip suppressing control operation is reset. It is then checked if a canceling condition of the slip suppressing control operation is established. The canceling condition includes three conditions, i.e., (1) a driver depresses the brake pedal 46; (2) a driver releases his foot from the accelerator pedal 94, and (3) the slip ratio is decreased to 0.1% or less. If one of these conditions is established, the canceling condition is satisfied.

More specifically, it is checked in step S12 if a brake switch (not shown) is ON. The brake switch is turned on when the brake pedal 46 is depressed. If YES in step S12, i.e., if it is determined that the brake pedal 46 is depressed and a braking operation is executed, it is determined that the canceling condition is established, and the flow jumps to step S14. On the other hand, if NO in step S12, the flow advances to step S16. In step S16, it is checked if an accelerate switch (not shown) is OFF. The accelerate switch is turned on when the accelerator pedal 94 is depressed, and is turned off when a foot is released from the pedal 94. If YES in step S16, that is, if it is determined that a foot is released from the accelerator pedal 94 and the throttle valve 92 is fully closed, it is determined that the canceling condition is established, and the flow jumps to step S14. If NO in step S16, the flow advances to step S18.

In step S18, the rotating speeds of the wheels FL, FR, RL, and RR are read through the rotating speed detection sensors 54a, 54b, 54c, and 54d. In step S20, the slip ratio SL is calculated on the basis of the above-mentioned calculation procedure. In step S22, a slip condition is determined on the basis of the calculated slip ratio SL. If it is determined that the slip ratio SL is equal or smaller than 0.1%, a slip condition "0" is set; if it is determined that the slip ratio SL falls within the first slip discrimination range (0.1%<SL<0.2%), a slip condition "1" is set; and if it is determined that the slip ratio SL falls within the second slip discrimination range (SL≧0.2%), a slip condition "2" is set. If the slip condition "0" is determined in step S18, the slip canceling condition is established, and the flow jumps to step S14.

In step S14, it is checked if the flag F is reset. If YES in step S14, this means that the slip suppressing control operation has not been executed immediately before step S14. Therefore, YES is determined in steps S12 and S16, and the slip condition "0" determined in step S22 does not mean that the canceling condition is satisfied but that the slip condition is not yet detected. As a result, if YES in step S14, the flow returns to step S12, and the similar control sequence to step S22 is repeated.

If NO in step S14, i.e., if it is determined that the slip suppressing control operation has been executed immediately before step S14 and the canceling condition is satisfied for the first time, the canceling operation of the slip suppressing control operation is then executed. The canceling operation will be described after a description of the slip suppressing control operation.

When the rear wheels RL and RR slightly slip and it is determined in step S22 that the slip ratio SL calculated in step S20 is in the first slip condition "1", the slip suppress signal $C_1$ is output in step S24, and the throttle control device 88 executes the first slip suppressing control operation by throttle control (control to decrease the opening of the throttle valve 92), as described above. It is then checked in step S26 if "2" is set in the flag F. If YES in step S26, i.e., if it is determined that "2" is set in the flag F, the flow returns to step S12, and the decision sequence of the canceling condition described above is executed. If NO in step S26, that is, if it is determined that "2" is not set in the flag F, "1" is set in the flag F in step S28, and the flow returns to step S12.

When the rear wheels RL and RR largely slip and it is determined in step S20 that the slip ratio SL calculated is in the second slip condition "2", the slip suppress signal $C_1$ is output in step S30, and the throttle control device 88 executes the first slip suppressing control operation by throttle control, as described above. In step S32, a control signal for instructing a braking operation for suppressing a slip is output to the slip control brake hydraulic system 50b, and the second slip suppressing control operation is executed, as described above. In step S34, the suspension control signal $C_3$ is output, and the suspension control device 36 executes the control operation for increasing the vehicle height of the rear portion of the vehicle body 14 and setting the damping characteristics of the dampers 32a and 34a of the rear wheels RL and RR in the hard mode, as described above. In step S36, "2" is set in the flag F, and the flow returns to step S12. Thus, the above-mentioned decision sequence of the canceling condition is executed.

As described above, the slip suppressing control operation and an operation for eliminating a squat phenomenon in the brake actuation state in the slip suppressing control operation are executed.

When one of the above-mentioned canceling conditions is satisfied in a state wherein the slip suppressing control operation is performed, the canceling operation of the slip suppressing control operation is executed. More specifically, if NO in step S14, the slip suppress inhibit signal $C_2$ is output in step S38, and a recovery operation of throttle control executed in step S24 and/or step S30, i.e., an operation for recovering the throttle valve 92 to a throttle opening immediately before throttle control is executed is executed.

It is checked in step S40 if "2" is set in the flag F. If NO in step S40, this means that the first slip suppressing control operation has been executed immediately before step S40. Neither the brake canceling operation nor the downward movement operation of the rear portion of the vehicle body 14 are executed, and the flow returns to step S10. This control sequence is restarted from the beginning.

If YES in step S40, this means that the second slip suppressing control operation has been executed immediately before step S40. In step S42, the brake actuation state in the slip control brake hydraulic system 50b is canceled. In step S44, the suspension control inhibit signal $C_4$ is output, so that the suspension state of the vehicle body 14 is recovered to a state immediately before the slip suppressing control operation is executed. Thereafter, the flow returns to step S10, and this control sequence is restarted from the beginning.

As described above, in this embodiment, since the passive type suspension devices 28, 30, 32, and 34 are employed, when the driving wheels are braked to suppress a slip, a squat phenomenon occurs and the vehicle body 14 of the driving wheel side squats unless any countermeasure is taken. However, in this embodiment, while the driving wheels are braked to suppress a slip, the suspension control operation for increasing the vehicle height of the rear portion of the vehicle body 14 and setting of the damping characteristics of the rear-wheel dampers 32a and 34a in the hard mode is executed through the suspension control device 36. In this manner, in this embodiment, even if the slip suppressing control by actuating the brake is executed, the so-called squat phenomenon in which the rear portion of the vehicle body 14 squats can be reliably prevented, and riding discomfort can be prevented. In other words, according to this embodiment, the slip suppressing control operation can be performed without making passengers uneasy.

The present invention is not limited to the arrangement of the above embodiment, and various changes and modifications may be made within the spirit and scope of the invention.

For example, in the above embodiment, the suspension devices 28, 30, 32, and 34 as control objects of the suspension control device 36 are of passive type, the brake system 12 as the slip suppressing device executes suspension control (i.e., sets the damping characteristics of the dampers 32a and 34a of the rear wheels RL and RR in the hard mode and increases the vehicle height of the rear portion of the vehicle body 14) through the suspension control device 36. However, the present invention is not limited to this arrangement. The control object of the suspension control device 36 is not limited to a passive type suspension device, and the present invention can be applied to an active type suspension device.

More specifically, in recent suspension devices for a vehicle, an active type suspension device whose suspension characteristic can be arbitrarily changed in accordance with a traveling condition of a vehicle has been proposed. In the active suspension, for example, as disclosed in Japanese Patent Publication No. 59-14365, a hydraulic cylinder device is inserted between portions for supporting sprung and unsprung weights, and supply and discharge of a working fluid (oil) to and from the hydraulic cylinder device are controlled, thereby controlling the suspension characteristics.

Another embodiment of a vehicle having a slip suppressing device and a suspension control device according to the present invention will now be described with reference to FIGS. 7A to 10. In the following description, the same reference numerals as in the above embodiment denote the same parts, and a detailed description thereof will be omitted. A brake system 12 as a slip suppressing device of this embodiment has the same arrangement as that in the above embodiment. In the following description, arrangements of active type suspension devices for wheels FL, FR, RL, and RR, and a suspension control device for controlling these suspension devices will be mainly described.

In the following description, an identification symbol "F" attached to reference numerals means that the corresponding component is used for a front wheel; "R", a rear wheel; "FR", a front right wheel; "FL", a front left wheel; "RR", a rear right wheel; and "RL", a rear left wheel. Therefore, when these identifications need not be made, the corresponding components are designated only by numerals without using the identification symbols of capital letters. When an internal arrangement is described in detail, the components are designated by combinations of numerals and identification symbols of small letters.

Figure 7A:
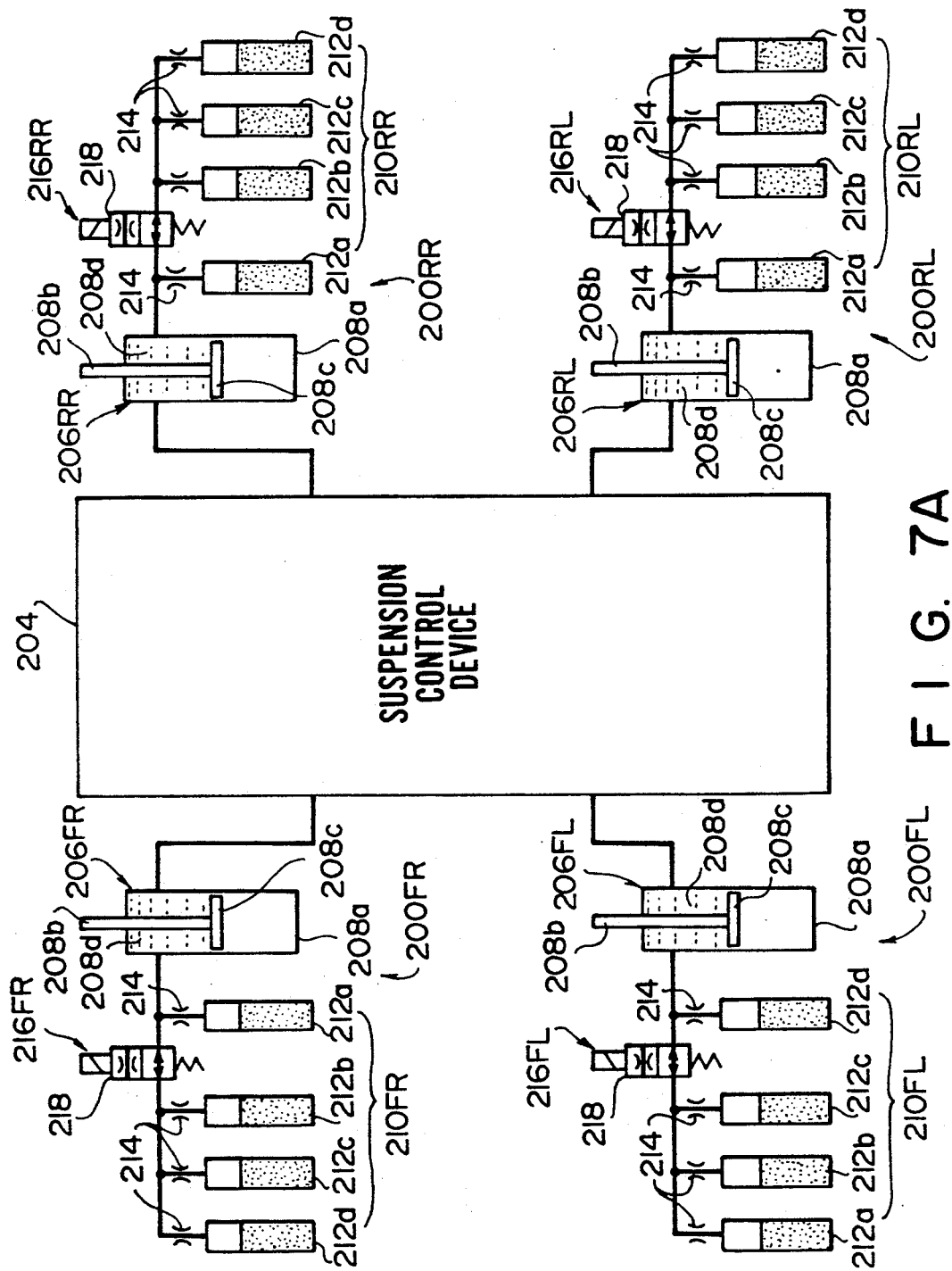
FIG. 7A is a schematic view showing a basic arrangement of a suspension devices equipped in the vehicle of another embodiment according to the present invention.
Figure 8:
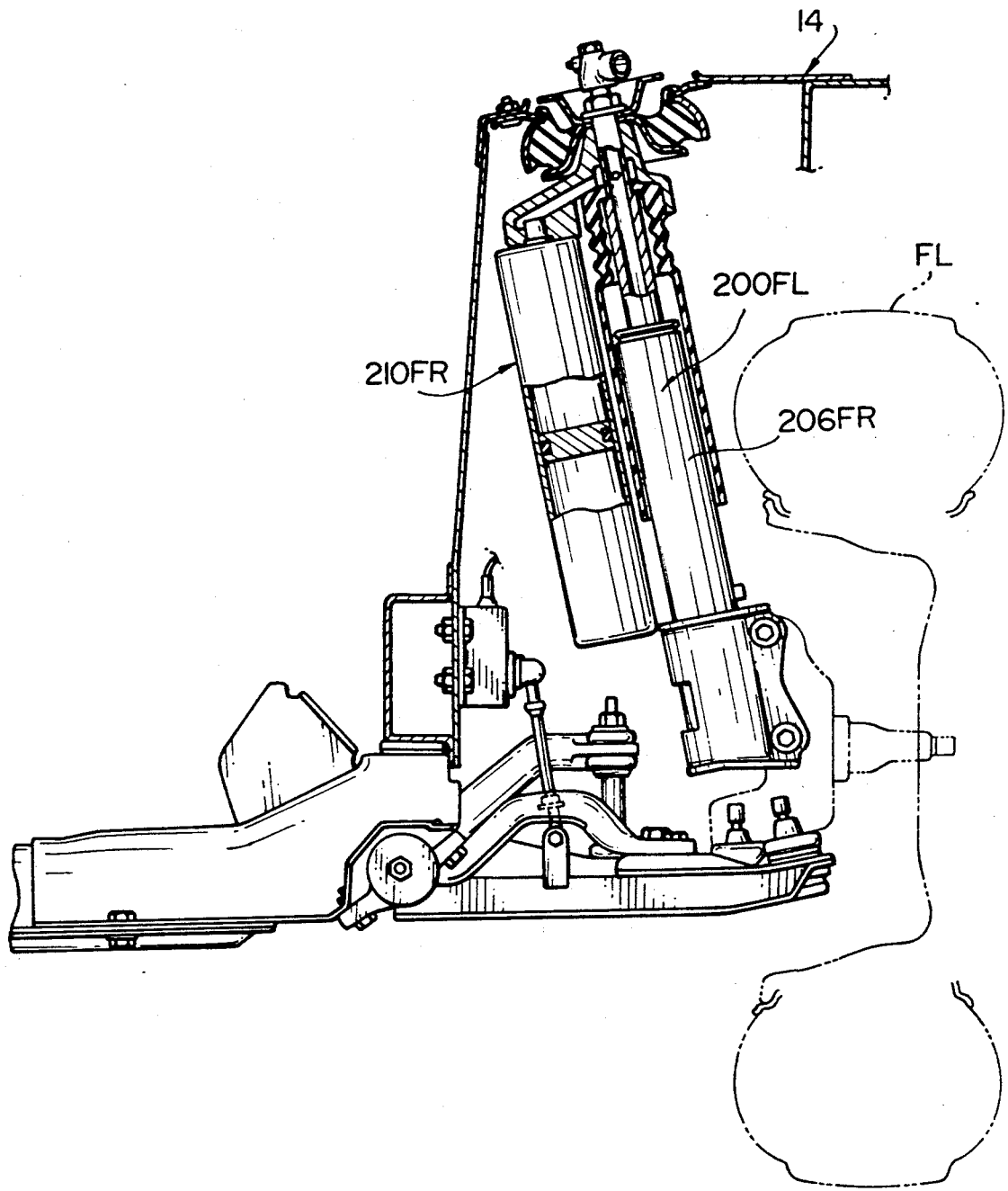
FIG. 8 is a partially cutaway front view of an arrangement of a suspension device for a front left wheel.

More specifically, as shown in FIG. 7A, suspension devices 200FL, 200FR, 200RL, and 200RR respectively comprise cylinder devices 206FL, 206FR, 206RL, and 206RR each of which is inserted between portions for supporting sprung and unsprung weights in units of the corresponding wheels FL, FR, RL, and RR, and to which a working oil from a pump 202 is applied while being subjected to supply/discharge control by a suspension control device 204. Note that FIG. 8 illustrates only the cylinder device 206FL for the front left wheel FL as a representative.

Figure 9:
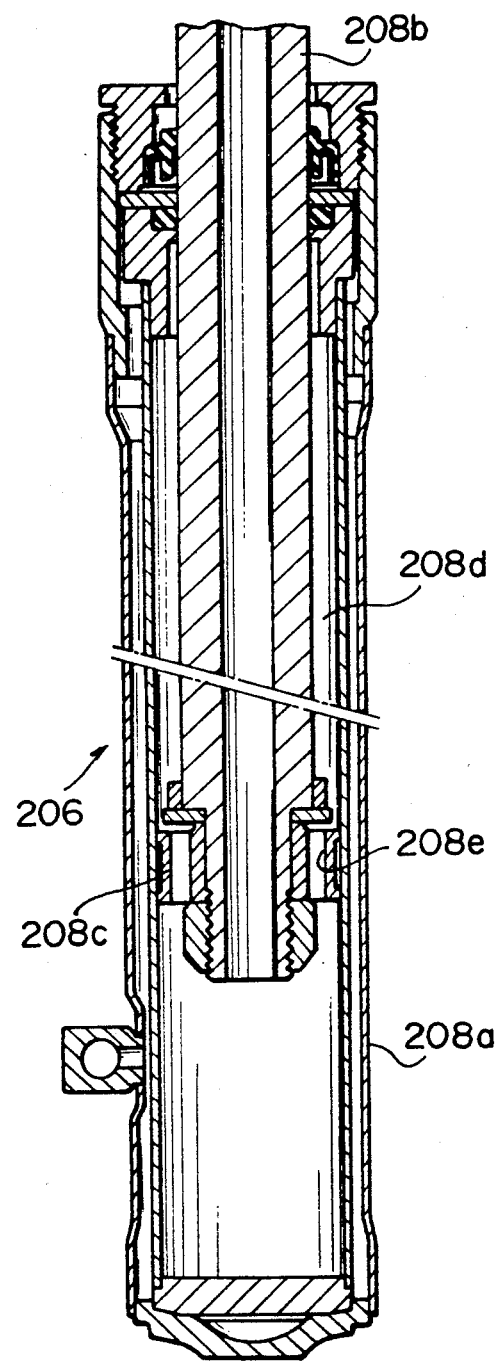
FIG. 9 is a sectional view showing a hydraulic cylinder device of the suspension device shown in FIG. 8.

As shown in FIG. 9, each of the cylinder devices 206FL, 206FR, 206RL, and 206RR comprises a cylinder 208a coupled to a portion for supporting an unsprung weight and a piston rod 208b for supporting a portion for supporting a sprung weight. In an upper portion of each cylinder 208a, a liquid chamber 208d is defined by a piston 208c integral with the piston rod 208b. The liquid chamber 208d communicates with a lower chamber through a communication hole 208e which is formed in the corresponding piston 208c and does not have an restriction effect.

With this structure, in the cylinder devices 206FL, 206FR, 206RL, and 206RR, when a working liquid is supplied into any liquid chamber 208d, the corresponding piston rod 208b expands, and the vehicle height of the corresponding portion of a vehicle body 14 is increased. When the working liquid is discharged from the liquid chamber 208d, the vehicle height of the corresponding portion of the vehicle body 14 is decreased.

As shown in FIG. 7A, gas spring mechanisms 210FL, 210FR, 210RL, and 210RR are respectively connected to the liquid chambers 208d of the cylinder devices 206FL, 206FR, 206RL, and 206RR. Each of the gas spring mechanisms 210FL, 210FR, 210RL, and 210RR comprises four small-diameter cylindrical springs 212a, 212b, 212c, and 212d. The four cylindrical springs 212a, 212b, 212c, and 212d in each of the gas spring mechanisms 210FL, 210FR, 210RL, and 210RR are connected to the corresponding liquid chamber 208d parallel to each other through orifices 214. Of the four cylindrical springs 212a, 212b, 212c, and 212d in each of the gas spring mechanisms 210FL, 210FR, 210RL, and 210RR, the three springs 212b, 212c, and 212d excluding the spring 212a are connected to the corresponding liquid chamber 208d through a corresponding one of switching valves 216FR, 216FL, 216RR, and 216RL.

When each of the switching valves 216FR, 216FL, 216RR, and 216RL is switched to a first switching position, as shown in FIG. 7A, the four cylindrical springs 212a, 212b, 212c, and 212d in each of the gas spring mechanisms 210FL, 210FR, 210RL, and 210RR communicate with the corresponding liquid chamber 208d only through the corresponding orifices 214, and a damping force (damping characteristic) at that time is small. When each of the switching valves 216FR, 216FL, 216RR, and 216RL is switched from the first switching position shown in FIG. 7A to a second switching position, the four cylindrical springs 212a, 212b, 212c, and 212d in each of the gas spring mechanisms 210FL, 210FR, 210RL, and 210RR communicate with the corresponding liquid chamber 208d through an orifice 218 formed in each of the switching valves 216FR, 216FL, 216RR, and 216RL as well as the orifices 214, and the damping force is large.

Of course, by changing the switching positions of the switching valves 216FR, 216FL, 216RR, and 216RL, the spring characteristics defined by the gas spring mechanisms 210FL, 210FR, 210RL, and 210RR are changed. The suspension characteristics are also changed by changing a supply amount of a working liquid to the liquid chamber 208d of the cylinder devices 206FL, 206FR, 206RL, and 206RR.

As shown in FIG. 7B, the suspension control device 204 for controlling the suspension characteristics of the suspension devices are inserted between the suspension devices 200FL, 200FR, 200RL, and 200RR and the pump 202. The suspension control device 204 comprises the pump 202, a hydraulic circuit 220 for supplying/discharging a working oil to/from the cylinder devices 206FL, 206FR, 206RL, and 206RR applied from the pump 202, and a damper controller 222 for electrically controlling the supply/discharge state of the working oil by the hydraulic circuit 220.

The pump 202 is arranged common to the suspension devices 200FL, 200FR, 200RL, and 200RR, and is driven by an engine 16. The pump 202 is connected to a common hydraulic path 226 to deliver a working oil drawn from the reservoir tank 224 to the path 226. The common hydraulic path 226 is branched into front and rear hydraulic paths 228F and 228R. The front hydraulic path 228F is further branched into front right and left hydraulic paths 228FR and 228FL. The rear hydraulic path 228R is further branched into rear right and left hydraulic paths 228RR and 228RL.

The front right hydraulic path 228FR is connected to the liquid chamber 208d of the cylinder device 206FR for the front right wheel, and the front left hydraulic path 228FL is connected to the liquid chamber 208d of the cylinder device 206FL for the front left wheel. A supply flow control valve 230FR and a pilot valve 232FR as a delay valve are connected in turn to the front right hydraulic path 228FR from the upstream side.

A first relief hydraulic path 234FR for the front left hydraulic path is connected to the front right hydraulic path 228FR between the valves 230FR and 232FR. The first relief hydraulic path 234FR is finally connected to the reservoir tank 224 through a front-wheel relief hydraulic path 236F. The first relief hydraulic path 234FR is connected to a discharge flow control valve 238FR.

A portion of the hydraulic path 228FR at the downstream side of the pilot valve 232FR is connected to the first relief hydraulic path 234FR through a second relief hydraulic path 240FR. A relief valve 242FR is connected to the second relief hydraulic path 240FR. A filter 244FR is inserted in a portion of the hydraulic path 228FR near the cylinder device 206FR. The filter 224FR is located between the cylinder device 206FR and the most adjacent valves 232FR and 242FR to prevent a wear powder produced upon sliding movement of the corresponding cylinder device 206FR from flowing forward to the valves 232FR and 242FR.

Note that the left front wheel hydraulic path has the same arrangement as that for the front right wheel. Thus, its arrangement is illustrated by suffixing symbol "FL" to reference numerals, and a repetitive description thereof will be avoided.

A plurality of main accumulators 246 are connected to the common path 226, and an accumulator 248F is connected to the front-wheel relief path 236F. Each main accumulator 246 serves as an accumulation source of a working liquid together with a sub accumulator 250 (to be described later), so that a supply amount of a working liquid to the cylinder devices 206FL, 206FR, 206RL, and 206RR is not insufficient. The accumulator 248F is arranged to prevent a high-pressure working liquid in the front-wheel cylinder devices 206FL and 206FR from immediately discharging into the constant-pressure reservoir tank 224, i.e., to prevent a water hammer phenomenon.

Working liquid supply/discharge hydraulic paths for the rear-wheel cylinder devices 206RL and 206RR have the same arrangement as those for the front wheels, and a repetitive description thereof will be avoided as in the above description. However, a rear-wheel hydraulic path 228R does not have components corresponding to the pilot valves 242FR and 242FL, and has the sub accumulator 250 taking into consideration the fact that the length of the hydraulic path from the main accumulators for the rear wheels is larger than that for the front wheels.

The common hydraulic path 226, i.e., the front- and rear-wheel hydraulic paths 228F and 228R are connected to the front-wheel relief hydraulic path 236F through a relief hydraulic path 252. A filter 254 is inserted in the common hydraulic path 226, and a pressure-regulating valve 256 for regulating a delivery pressure from the pump 202 to fall within a predetermined range is connected to the path 226. In this embodiment, the pump 202 comprises a variable volume type in-line piston pump, and the pressure-regulating valve 256 is assembled in the pump 202, so that its delivery pressure is set to fall within the range of 120 to 160 kg/cm$^2$.

The pilot valves 232 (232FR, 232FL, 232RR, and 232RL) described above are opened/closed in accordance with a pressure difference between the pressure in the front and rear hydraulic paths 228F and 228R, i.e., the pressure in the common hydraulic path 226 and the pressures in the corresponding cylinder devices 206FL, 206FR, 206RL, and 206RR. For this purpose, a common pilot hydraulic path 258F branched from the hydraulic path 228F is led to the front-wheel pilot valves 232FR and 232FL. One hydraulic path 258FR of two branch pilot hydraulic paths branched from the common pilot hydraulic path 258F is connected to the pilot valve 232FR, and the other hydraulic path 258FL is connected to the pilot valve 232FL. An orifice 260F is formed in the common pilot hydraulic path 258F.

Note that a rear-wheel pilot hydraulic path has the same arrangement.

The operation of the valves described above will be briefly described below.

(1) Switching Valve 216 (216FR, 216FL, 216RR, and 216RL)

In this embodiment, each switching valve 216 is switched to increase a damping force during only turning.

(2) Relief Valve 242

Each relief valve 242 is normally closed, and is opened when a pressure in a corresponding one of the cylinder devices 206FL, 206FR, 206RL, and 206RR exceeds a predetermined value (160 to 200 kg/cm² in this embodiment). More specifically, the relief valve 242 serves as a safety valve for preventing pressures in the cylinder devices 206FL, 206FR, 206RL, and 206RR from being abnormally increased.

Of course, the relief valve 242 can be provided to the rear-wheel cylinder devices 206RL and 206RR. However, in this embodiment, no relief valve 242 is provided to the rear-wheel side taking into consideration the fact that the pressure at the rear wheel side never exceeds the pressure at the front wheel side under a condition that the weight distribution is considerably larger in the front portion than in the rear portion.

(3) Flow Control Valves 230 and 238

The supply and discharge flow control valves 230 and 238 comprise solenoid type spool valves and are appropriately switched between open and closed states. In the open state, these valves have a pressure difference adjusting function of making constant a pressure difference between upstream and downstream sides of the valves (the pressure difference must be made constant in terms of flow control). More specifically, in each of the flow control valves 230 and 238, a deviation position of its spool, i.e., opening is changed in proportion to a current supplied to the valve, and the supply current is determined on the basis of a flow rate-current correspondence map prepared and stored in advance in a memory. That is, the supply current corresponds to a required flow rate at that time. When the flow control valves 230 and 238 are controlled, supply and discharge of a working liquid to and from the cylinder devices 206FL, 206FR, 206RL, and 206RR are controlled, thus controlling the suspension characteristics.

In addition, when an ignition switch is turned off, only control for decreasing a vehicle height is performed for a predetermined period of time (2 minutes in this embodiment) from the OFF operation of the ignition switch. More specifically, these valves can prevent the vehicle height from being locally changed in consideration of a change in load weight caused when passengers or the like leave a vehicle (to attain a reference vehicle height).

(4) Pilot Valve 232

As has already been described above, a pressure in the common hydraulic path 226 is decreased upon operation of the orifices 260F and 260R, and each pilot valve 232 is opened to be delayed from the decrease in pressure.

The damper controller 222 will be described below with reference to FIG. 10.

The damper controller 222 receives signals from sensors 262FR to 262RL, 264FR to 264RL, 266FR, 266FL, 266R, 268, and 270 to 274, and an ignition switch 276 (to be described later). The damper controller 222 outputs a signal to the switching valves 216 (216FR, 216FL, 216RR, and 216RL), the flow control valves 230 (230FR, 230FL, 230RR, and 230RL), and a warning device 278 such as a warning lamp, warning buzzer, or the like (to be described later).

The sensors 262FR to 262RL are arranged in correspondence with the cylinder devices 206FR to 206RL, and detect their expansion amounts, i.e., vehicle heights of the vehicle body 14 at the respective wheel positions. The sensors 264FR to 264RL are arranged in correspondence with the liquid chambers 208d of the cylinder devices 206FR to 206RL, and detect their pressures. The sensors 266FR, 266FL, and 266R comprise G sensors for detecting accelerations in a vertical direction of the vehicle body 14. Upon detection of the accelerations in the vertical direction, the pair of sensors 266FR and 266FL are symmetrically arranged on a front wheel shaft at the front side of the vehicle body 14, and the single sensor 266R is arranged at the central position on the rear wheel shaft at the rear side of the vehicle body 14. These three sensors 266FR, 266FL, and 266R define an imaginary plane representing the vehicle body 14. Note that the imaginary plane is almost horizontally set.

The sensor 268 detects a pressure of each main accumulator 246. The sensor 270 detects an operation speed of a steering wheel, i.e., a steering angular velocity. In practice, a steering angle is detected, and a change in detected steering angle as a function of time is calculated, thus obtaining a steering angular velocity. The sensor 274 detects a lateral G acting on the vehicle body 14. In this embodiment, the single sensor 274 is arranged on a Z axis of the vehicle body 14.

The damper controller 222 basically performs active control, in other words, position control (vehicle height signal control) of the vehicle body 14, riding comfort control (vertical acceleration signal control), and torsion control (compression signal control) of the vehicle body 14. These control results are finally expressed as a flow rate of a working liquid flowing through the flow control valves 230 and 238 as the flow control mechanisms.

In particular, the damper controller 222 executes a special position control operation for suppressing a squat phenomenon during an interval from when it receives a suspension control signal $C_1$ from a brake system 12 as a slip suppressing device at the beginning of a slip suppressing control operation by the brake system 12 until it receives a suspension control inhibit signal $C_4$ output from the brake system 12 upon completion of the slip suppressing control operation.

The position control operation (active control) of the vehicle body 14 in the damper controller 222 will be briefly described below.

The position control consists of three position control sequences for suppressing three factors, i.e., bounce, pitch (pitching), and roll. Each control sequence is realized by feedback control by PD control (proportional-derivative control). The position control is performed on the basis of the detection outputs from the vehicle height sensors 262FR to 262RL. In the bounce control sequence, a sum of the vehicle heights detected by the vehicle height sensors 262FR and 262FL of the front wheels FR and FL and a sum of the vehicle heights detected by the vehicle height sensors 262RR and 262RL of the rear wheels RR and RL are PD-controlled to coincide with a reference vehicle height.

In the pitch control sequence, a value obtained by subtracting the sum of the vehicle heights detected by the vehicle height sensors 262RR and 262RL of the rear wheels RR and RL from the sum of the vehicle heights detected by the vehicle height sensors 262FR and 262FL of the front wheels FR and FL is PD-controlled toward 0. In the roll control, the sum of the vehicle heights detected by the vehicle height sensors 262FL and 262RL of the left wheels FL and RL and a sum of the detection values of the vehicle height sensors 262FR and 262RR of the right wheels FR and RR are PD-controlled to coincide with each other (to attain a target roll angle).

The control values obtained by the three PD control operations are calculated in units of the four cylinder devices 206FR, 206FL, 206RR, and 206RL. The control values are added in units of the cylinder devices 206FR, 206FL, 206RR, and 206RL, and are finally determined as flow rate signals for four kinds of position control.

The above-mentioned pitch control and roll control employ equation (4) described above for a PD control formula. A control gain for each control is independently set.

As described above, since the suspension control device 204 executes the position control, the position of the vehicle body 14 can be satisfactorily maintained. Note that if the position control is strictly executed, riding comfort is impaired. Therefore, the suspension control device 204 separately executes riding comfort control for preventing riding comfort from being impaired, and also executes wove control for suppressing torsion of the vehicle body 14. However, these control operations are not related to the gist of the present invention, and a detailed description thereof will be omitted.

The characteristic feature of this embodiment will be described below. As a special position control operation for suppressing a squat phenomenon, a correction operation of a vehicle height detection signal in the pitch control sequence is executed. More specifically, when the damper controller 222 receives the suspension control signal $C_3$, it executes the pitch control sequence using a value obtained by subtracting the detection values of the detection signals output from the vehicle height sensors 262RR and 262RL of the rear wheels RR and RL at predetermined ratios as pseudo detection signals.

As a result, in the pitch control sequence, a value obtained by subtracting the sum of the pseudo signal values of the vehicle height sensors 262RR and 262RL of the rear wheels RR and RL from the sum of the vehicle heights detected by the vehicle height sensors 262FR and 262FL of the front wheels FR and RL is PD-controlled toward zero. Therefore, when both the values become zero, the height of the rear portion of the vehicle body 14 is essentially increased as compared to the front portion, i.e., a so-called rear-up state is attained. A control operation for setting a value obtained by the detection values of the detection signals output from the vehicle height sensors 262RR and 262RL of the rear wheels RR and RL at predetermined ratios as the pseudo detection signals is intermittently executed until the suspension control inhibit signal $C_4$ is output.

Note that when the suspension devices 200FL, 200FR, 200RL, and 200RR for suspending the vehicle body 14 are of an active type, they are automatically operated on the basis of their position control operations to eliminate a squat phenomenon occurring when the braking operation for suppressing a slip is executed. An operation for eliminating the squat phenomenon based on position control in an active suspension is executed as follows. That is, based on the fact that the squat phenomenon actually occurs and detection values of the detection signals output from the vehicle height sensors 262RR and 262RL of the rear wheels RR and RL are decreased, the operation is executed to recover the decreased values to original values (or target values). As a result, in a conventional active suspension, it is difficult to prevent generation of a squat phenomenon itself, and the squat phenomenon inevitably occurs even for a short period of time and to a small extent.

However, in this embodiment, the damper controller 222 corrects the detection values of the detection signals output from the vehicle height sensors 262RR and 262RL of the rear wheels RR and RL by subtracting them at predetermined ratios to define pseudo detection signals upon reception of the suspension control signal $C_3$ output from the brake system 12 at the beginning of the slip suppressing operation, and executes the pitch control sequence as special position control on the basis of these pseudo detection signals.

As a result, in this embodiment, an upward movement operation of the rear portion of the vehicle body 14 is executed before detection of the squat phenomenon on the basis of the detection results from the vehicle height sensors 262RR and 262RL. In this manner, even when the braking operation for suppressing a slip is executed and the rear portion of the vehicle body 14 squats by the braking operation, since the rear portion of the vehicle body 14 is moved upward in advance, as described above, the driver and passengers of a vehicle 10 do not experience the squat phenomenon. More specifically, according to this embodiment, when the slip suppressing control operation is performed, the active type suspension devices can be controlled, so that passengers do not feel uneasy.

In both the above two embodiments, i.e., one embodiment wherein the present invention is applied to the passive type suspension device and the other embodiment wherein the present invention is applied to the active type suspension device, the vehicle 10 is a rear-drive vehicle. However, the present invention is not limited to this but can be applied to a front-drive vehicle. When the present invention is applied to the front-drive vehicle, suspension devices to be controlled are those for front wheels, as a matter of course.

The present invention may also be applied to a four-wheel drive vehicle. In this case, suspension devices to be controlled are those for front or rear wheels causing a slip.

As many apparently widely different embodiments of the present invention can be made without departing from the spirit and scope thereof, it is to be understood that the invention is not limited to the specific embodiments thereof except as defined in the appended claims.

What is claimed is:

1. A vehicle which comprises:
    a power unit;
    at least a pair of driving wheels rotated by an output from said power unit;
    fluid pressure cylinders, inserted between a vehicle body and said driving wheels, for adjusting a vehicle height of said vehicle body at one end where said driving wheels are placed;
    a fluid pressure source for supplying a high-pressure working fluid to said fluid pressure cylinders;

flow control means for controlling supply and discharge of the high-pressure working fluid to and from said fluid pressure source;

slip detection means for detecting a driving force slip of said driving wheels;

brake means for decreasing a rotating force of said driving wheels;

slip suppressing mean for, when said slip detection means detects a slip of said driving wheels, operating said brake means to suppress the slip; and suspension control means for controlling said flow control means, said suspension control means starting to control said flow control means to supply the high-pressure working fluid to said fluid pressure cylinders in order to increase the height of the vehicle body at said one end where said driving wheels are placed, when said slip suppressing means starts to perform the braking operation as the slip suppressing operation.

2. The vehicle according to claim 1,
wherein said driving wheels are rear wheels.

3. The vehicle according to claim 2, which further comprises vehicle height detection means for detecting a height of a rear portion of said vehicle body relative to said driving wheels, and
wherein said suspension control means controls said flow control means to supply the high-pressure working fluid until said vehicle height detection means detects that the vehicle height of the rear portion of said vehicle body is increased to a predetermined level relative to said driving wheels.

4. The vehicle according to claim 3,
wherein the high-pressure working fluid comprises high-pressure air.

5. The vehicle according to claim 2, which further comprises damper means which is inserted between said vehicle body and said driving wheels and whose damping forces are variable, and
wherein said suspension control means functions to increase the damping forces of said damper means at the same time said slip suppressing control operation is initiated.

6. The vehicle according to claim 1,
wherein said slip suppressing means comprises power unit control means for, when a slip is detected, decreasing an output from said power unit.

7. The vehicle according to claim 6,
wherein a slip ratio detected by said slip detection means is small, said slip suppressing means causes said power unit control means to decrease the output of said power unit to suppress a slip, and when the slip ratio detected by said slip detection means is large, said slip suppressing means causes said power unit control means to decrease the output of said power unit and operates said brake means to suppress a slip.

8. The vehicle according to claim 7, wherein said power unit functions to control the open and closed state of a throttle valve of said power unit.

9. A vehicle which comprises:
a vehicle body;
a power unit mounted in said vehicle body;
at least a pair of driving wheels rotated by an output from said power unit;
suspension devices between said driving wheels and said vehicle body for adjusting the height of said vehicle body relative to said driving wheels;
suspension control means for controlling a suspension state of said suspension devices;
slip detection means for detecting a slip state of said driving wheels; and
slip suppressing means for, when said slip detection means detects a slip of said driving wheels, decreasing a rotating force of said drive wheels to suppress a slip, and for outputting a control signal to said suspension control means to increase the height of said vehicle body relative to said driving wheels.

10. The vehicle according to claim 9,
wherein said suspension devices comprise passive type suspension devices capable of adjusting a vehicle height by air pressure, and
said suspension control means receives the control signal and pneumatically controls said suspension devices to increase the height of the vehicle body where said drive wheels are arranged.

11. The vehicle according to claim 9, wherein said suspension devices comprise active type suspension devices which comprise vehicle body height detection means for detecting the vehicle body height relative to said driving wheels and are feedback controlled to maintain a predetermined vehicle body height on the basis of detected results from said vehicle body height detection means.

12. A vehicle which comprises:
a power unit;
at least a pair of driving wheels rotated by an output from said power unit;
vehicle body height detection means for detecting a height of a vehicle body relative to said driving wheels where said driving wheels are arranged;
fluid pressure cylinders inserted between said vehicle body and said driving wheels for adjusting the height of said vehicle body where said driving wheels are arranged;
a fluid pressure source for supplying a high-pressure working fluid to said fluid pressure cylinders;
flow control means for controlling supply and discharge of the high-pressure working fluid to and from said fluid pressure source to obtain a predetermined vehicle body height on the basis of the detected result from said vehicle height detection means;
slip detection means for detection of a driving force slip of said driving wheels;
brake control means for decreasing the rotating force of said driving wheels and for outputting a control signal on the detection of slip;
slip suppressing means for operating, when said slip detection means detects a slip of said driving wheel, said brake means to suppress the slip; and
suspension control means for receiving said control signal from said brake control means and controlling said flow control means to begin to increase the vehicle body height relative to said driving wheels before said slip suppressing operation is performed by said slip suppressing means.

13. The vehicle according to claim 12, wherein aid suspension control means corrects the detection signal from said vehicle height detection means to increase the vehicle height of said vehicle body where said driving wheels are arranged.

14. The vehicle according to claim 12,
wherein aid driving means are rear wheels, and
said suspension control means functions to cause said flow control means to supply high-pressure working fluid to said fluid pressure cylinders when the slip suppressing control operation is started.

15. The vehicle according to claim 12, wherein said slip suppressing means comprises power unit control means for, when a slip is detected, decreasing an output from said power unit.

16. The vehicle according to claim 15, wherein when a slip ratio detected by said slip detection means is small, said slip suppressing means causes said power unit control means to decrease the output of said power unit to suppress a slip, and when the slip ratio detected by said slip detection means is large, said slip suppressing means causes said power unit control means to decrease the output of said power unit and operates said brake means to suppress a slip.

17. The vehicle according to claim 16, wherein said power unit functions to control the open and closed state of a throttle valve of said power unit.

* * * * *

UNITED STATES PATENT AND TRADEMARK OFFICE
CERTIFICATE OF CORRECTION

PATENT NO. : 5,069,302

DATED : December 3, 1991

INVENTOR(S) : Fumio Kageyama

It is certified that error appears in the above-identified patent and that said Letters Patent is hereby corrected as shown below:

Column 10, line 38:
"a" (first occurrence) should be -- $\underline{a}$ --;

Column 10, line 38:
"b" should be -- $\underline{b}$ --;

Column 10, line 42:
"c" should be -- $\underline{c}$ --;

Column 10, line 43:
"d" should be -- $\underline{d}$ --;

Column 10, line 57:
"c" should be -- $\underline{c}$ --;

Column 10, line 61:
"d" should be -- $\underline{d}$ --;

UNITED STATES PATENT AND TRADEMARK OFFICE
CERTIFICATE OF CORRECTION

PATENT NO. : 5,069,302

DATED : December 3, 1991

INVENTOR(S) : Fumio Kageyama

It is certified that error appears in the above-identified patent and that said Letters Patent is hereby corrected as shown below:

Column 25, claim 1, line 8:
"mean" should be --means--;

Column 26, claim 14, line 66:
"aid" should be --said--.

Signed and Sealed this

Fifteenth Day of June, 1993

Attest:

MICHAEL K. KIRK

Attesting Officer

Acting Commissioner of Patents and Trademarks